United States Patent
Osaka

(10) Patent No.: US 7,291,942 B2
(45) Date of Patent: Nov. 6, 2007

(54) AUTOFOCUS ACTUATOR

(75) Inventor: Tomohiko Osaka, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 162 days.

(21) Appl. No.: 11/173,648

(22) Filed: Jun. 30, 2005

(65) Prior Publication Data

US 2006/0034599 A1    Feb. 16, 2006

(30) Foreign Application Priority Data

Aug. 13, 2004    (JP)    ............... 2004-236122

(51) Int. Cl.
*H02K 41/00*    (2006.01)
*G11B 7/00*    (2006.01)
*G11B 11/00*    (2006.01)

(52) U.S. Cl. .................. 310/12; 310/14; 359/814; 359/823; 359/824; 369/44.14; 369/44.16; 369/44.22

(58) Field of Classification Search ............ 310/12–15, 310/17; 369/44.14–44.16, 44.21; 359/813, 359/814, 815, 822, 823, 824
See application file for complete search history.

(56) References Cited

U.S. PATENT DOCUMENTS

| | | | |
|---|---|---|---|
| 4,660,190 A | * | 4/1987 | Fujii et al. ............... 369/44.16 |
| 5,317,221 A | * | 5/1994 | Kubo et al. .................... 310/12 |
| 6,195,314 B1 | * | 2/2001 | Inui et al. ............... 369/44.14 |
| 6,813,225 B2 | * | 11/2004 | Widdowson et al. .... 369/44.15 |
| 7,071,584 B2 | * | 7/2006 | Kawano et al. ............... 310/14 |

FOREIGN PATENT DOCUMENTS

| | | | |
|---|---|---|---|
| JP | 60157733 A | * | 8/1985 |
| JP | 2003-295033 | | 10/2003 |
| JP | 2004-280031 | | 7/2004 |

* cited by examiner

*Primary Examiner*—Tran Nguyen
(74) *Attorney, Agent, or Firm*—Marger Johnson & McCollom, P.C.

(57) ABSTRACT

An autofocus actuator is provided with a yoke 320 that comprises an inner cylindrical portion 321 defining an insertion bore 35 through which a hollow body portion of a holder is adapted to be received and an outer cylindrical portion 322 provided outside of the inner cylindrical portion with a predetermined spacing left between the inner cylindrical portion and the outer cylindrical portion by a connecting portion 324. Four tab-shaped portions 325 are integrally formed with an end surface of the outer cylindrical portion 322 of the yoke in such a manner that the tab-shaped portions remain flush with the end surface of the outer cylindrical portion and extend outwardly from the outer cylindrical portion. The tab-shaped portions 325 are so formed as to leave a concave portion 327 between the adjacent tab-shaped portions. This assures that the tab-shaped portion 325 can make contact with a leaf spring in a broader area, thus enabling the leaf spring to be reliably bonded to the yoke 320. Moreover, the yoke 320 can be aligned with ease by disposing a part of a support frame within the concave portions 327 formed between the adjacent tab-shaped portions 325.

6 Claims, 18 Drawing Sheets

AUTOFOCUS ACTUATOR

BACKGROUND OF THE INVENTION

1. Field of the Invention

The present invention relates to an autofocus actuator, and more specifically to an autofocus actuator that can be employed in digital cameras or other small-sized electronic apparatuses equipped with a camera, e.g., cellular phones.

2. Description of the Related Art

In digital cameras, an actuator that can displace a lens in an optical axis direction is employed for the sake of autofocusing and zooming operations. This type of actuator is adapted to displace the lens in the optical axis direction by virtue of an interaction between the magnetic field generated by the electricity flowing through a coil and the magnetic field of a permanent magnet. In recent years, a need exists for the function of autofocus even in a camera mounted to cellular phones, because the number of pixels of a picture-taking element for use in the cellular phone camera tends to increase up to the order of mega pixels greater than one million.

One example of conventional autofocus actuators is disclosed in Japanese Patent Laid-open Publication No. 2003-295033. This autofocus actuator is comprised of a front lens, a front support frame for supporting the front lens, a front coil attached to the front support frame, a front spring affixed to the front support frame, a rear lens, a rear support frame for supporting the rear lens, a rear coil attached to the rear support frame, a rear spring affixed to the rear support frame, a magnet, a magnet support member and a yoke. The front coil is disposed in the outer gap between the magnet and the yoke, while the rear coil is located in the inner gap between the magnet and the yoke. Applying electric current to the front coil enables the front lens to move into a position where the front lens keeps in balance with the resilient force of the front spring. Likewise, applying electric current to the rear coil can bring the rear lens into a position where the rear lens keeps in balance with the resilient force of the rear spring.

The conventional actuator referred to above is of such construction that electricity is supplied to the coils via the front spring and the rear spring. This means that electrode portions for the coils and the power source should be provided on the front spring and the rear spring, respectively. In order to form such electrode portions, the front spring and the rear spring have to be subjected to bending process. A need of such bending process reduces the yield rate or productivity of the springs.

Furthermore, it is necessary to insulate the springs from other components due to the fact that coils or lead wires are directly soldered to the springs themselves for electric connection. This poses a drawback in that the number of parts of the actuator is increased.

Moreover, the front spring and the rear spring are of mutually different shape, which disadvantageously leads to an increased manufacturing cost of the springs.

In order to solve the problems noted above, the inventor of the subject application has conceived an autofocus actuator as illustrated in FIGS. 1 through 14.

The problems existed in the conventional actuators can be overcome by the actuator shown in FIGS. 1 through 14. This actuator uses a pair of leaf springs (gimbal springs) that are respectively sandwiched between the opposite end surfaces of a yoke and the corresponding support frames and bonded thereto with an adhesive. However, as will be described later in details, one of the end surfaces of the yoke is formed from an end surface of an outer cylindrical portion of the yoke, and thus its bonding area to which the leaf spring is to be bonded is extremely small. Therefore, sufficient bonding strength can be not be obtained between the yoke and the spring. In case that a shock is inadvertently applied to the autofocus actuator, the leaf springs may be detached or dislocated. Therefore, it would be desirable to avoid such problem as far as possible.

In addition, the actuator referred to hereinabove requires the use of a gig or the like in the process of assembly to align the yoke with the support frame, thus making the assembly process troublesome. Therefore, it would also be desirable to avoid such a problem.

SUMMARY OF THE INVENTION

With the above-mentioned problems in mind, it is an object of the present invention to provide an autofocus actuator that includes a yoke having a sufficient bonding area to a leaf spring.

In order to achieve the above object, the present invention is directed to an autofocus actuator which comprises: a holder having a hollow body portion having one end to which a lens is attached; a coil fixedly secured to the holder in such a manner as to surround the hollow body portion of the holder; a pair of leaf springs respectively provided on opposite end sides of the hollow body portion of the holder for supporting the holder displaceably in an optical axis direction of the lens with the holder being positioned in a radial direction; and a yoke having a permanent magnet provided in a confronting relationship with the coil, the yoke adapted to adjust the position of the lens attached to the holder in the optical axis through the use of interaction between a magnetic field of the permanent magnet and a magnetic field generated by the coil as the coil is supplied with electric power, wherein the yoke has an end surface that makes contact with the leaf spring positioned on the other end of the hollow body portion of the holder, and the end surface of the yoke is integrally formed with an increased bonding surface for retaining the leaf spring with an adhesive.

With the autofocus actuator of the present invention constructed as above, the leaf spring located on the side of the other end of the hollow body portion of the holder is bonded not only to the end surface but also to the increased bonding surface of the yoke. Accordingly, it becomes possible to bond the leaf spring to the yoke in more stable and reliable manner than in the case where the bonding takes place only for the end surface of the yoke.

According to the present invention, it is preferred that the yoke comprises an inner cylindrical portion having a insertion bore into which the hollow body portion of the holder is adapted to be received and an outer cylindrical portion provided outside of the inner cylindrical portion with a predetermined spacing left between the inner cylindrical portion and the outer cylindrical portion by a connecting portion, the end surface of the yoke being an end surface of the outer cylindrical portion thereof. Further, it is also preferred that the increased bonding surface comprises at least one tab-shaped portion integrally formed with the end surface of the outer cylindrical portion of the yoke in such a manner that the tab-shaped portion remains flush with the end surface of the outer cylindrical portion and extends outwardly from the outer cylindrical portion.

This makes sure that the yoke with the tab-shaped portion can be readily produced through an integral forming process.

According to the present invention, it is also preferred that the tab-shaped portion comprises four tab-shaped portions integrally provided on the end surface of the outer cylindrical portion of the yoke with an angular spacing of substantially 90 degrees.

This makes it possible that a leaf spring can be stably and reliably bonded to the yoke through the use of the four tab-shaped portions.

According to the present invention, it is further preferred that each of the tab-shaped portions has a peripheral edge substantially in coincide with a tangential line of the end surface of the outer cylindrical portion of the yoke.

This assures that the bonding surface of the yoke to which the leaf spring is bonded can be widened while keeping the diameter size of the yoke equal to that of the yoke free from the tab-shaped portions.

According to the present invention, it is still further preferred that the tab-shaped portions are so formed as to leave a concave portion between the adjacent tab-shaped portions.

This allows post portions of the support frame to be positioned within the recesses, respectively, thereby aligning the yoke with respect to the support frame.

According to the present invention, it is yet still further preferred that the increased bonding surface comprises a flange portion integrally formed along a periphery of the end surface of the outer cylindrical portion of the yoke in such a manner that the flange portion remains flush with the end surface of the outer cylindrical portion and extends outwardly from the outer cylindrical portion.

By way of this construction, the yoke with the flange portion can be readily produced through an integral forming process. Furthermore, the leaf spring can be bonded to both the end surface and the flange portion of the yoke. This makes it possible to bond the leaf spring to the yoke in more stable and reliable manner than in the case where the bonding takes place only for the end surface of the yoke.

The above and other objects and features of the invention will become more apparent from the following detailed description when the same is read in conjunction with the accompanying drawings that are presented for the purpose of illustration only.

DETAILED DESCRIPTION OF THE PREFERRED EMBODIMENT

An autofocus actuator proposed by the present inventor and used as the premise of the present invention will be first described in detail with reference to the drawings attached.

Figure 1:
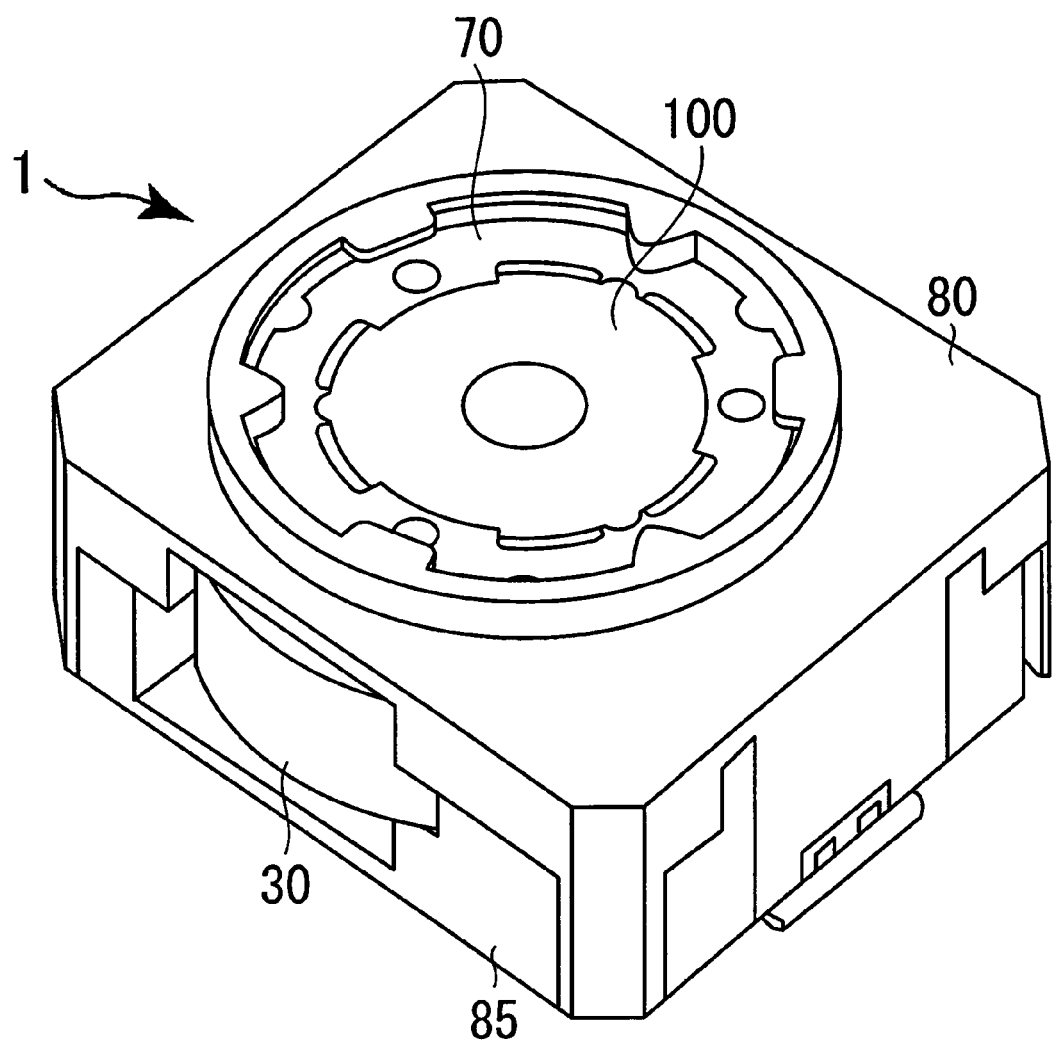
FIG. 1 is a perspective view showing the external appearance of an autofocus actuator proposed by the inventor of the present invention.
Figure 2:
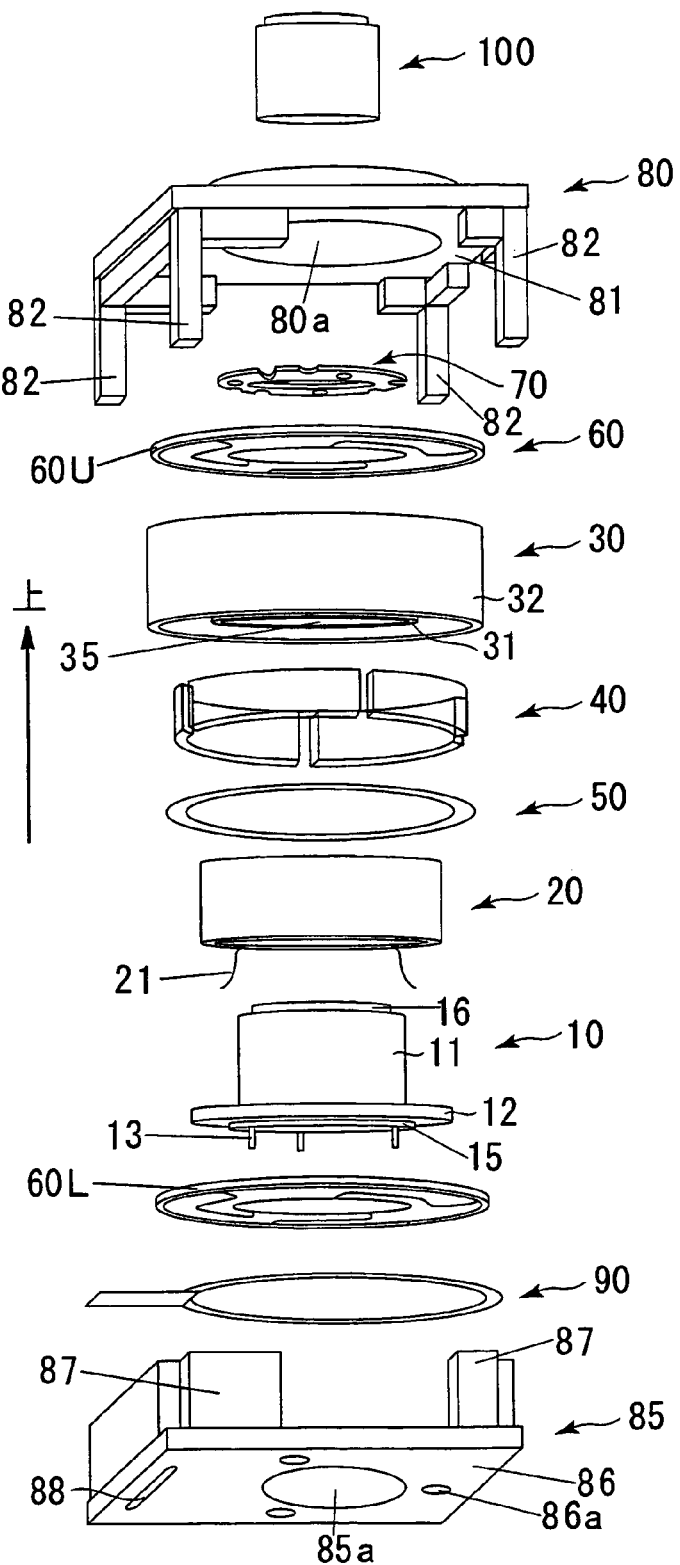
FIG. 2 is an exploded perspective view of the autofocus actuator shown in FIG. 1.
Figure 3:
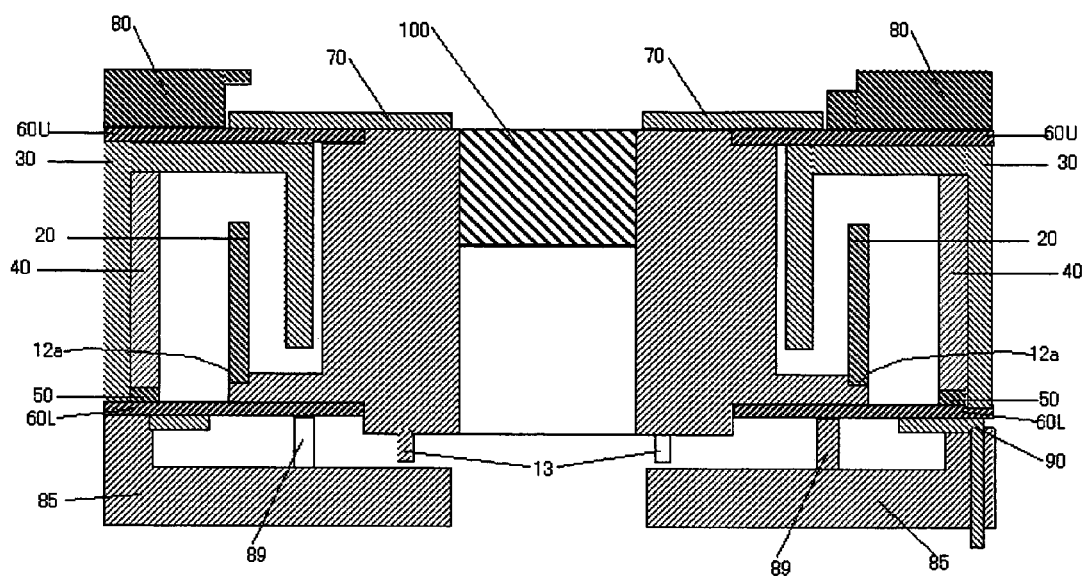
FIG. 3 is a schematic cross-sectional view of the autofocus actuator shown in FIG. 1.

Referring to FIG. 1, there is shown perspective view showing the external appearance of the autofocus actuator. FIG. 2 is an exploded perspective view of the autofocus actuator shown in FIG. 1. FIG. 3 is a schematic cross-sectional view of the autofocus actuator shown in FIG. 1.

As shown in FIGS. 1, 2 and 3, the autofocus actuator 1, simply referred to as "actuator" hereinbelow, is generally composed of: a holder 10 including a hollow body portion 11 having one end to which a lens assembly 100 is attached, and a flange portion 12 provided along the perimeter of the other end of the hollow body portion 11; a coil 20 fixedly secured to the holder 10 in a spaced-apart relationship with the outer circumference of the hollow body portion 11; a cylindrical yoke 30 including an inner cylindrical portion 31 having an insertion bore 35 into which the hollow body portion 11 of the holder 10 is inserted, an outer cylindrical portion 32 provided outside of the inner cylindrical portion 31 with a predetermined spacing left therebetween, and a connecting portion 34 for integrally interconnecting the ends of the inner cylindrical portion 31 and the outer cylindrical portion 32 at opposite side from the flange portion 12 of the holder 10, the yoke 30 adapted to accommodate the coil 20 within the space of predetermined gap size between the inner cylindrical portion 31 and the outer cylindrical portion 32; a plurality of permanent magnets 40 disposed on the magnet mounting surface 33 of the inner circumference of the outer cylindrical portion 32 of the cylindrical yoke 30 in a spaced-apart confronting relationship with the coil 20; a magnetic member 50 disposed to interconnect the permanent magnets 40 in such a condition that the magnetic member 50 is kept in contact with the opposite surfaces of the permanent magnets 40 from the connecting portion 34 of the cylindrical yoke 30; a pair of leaf springs (gimbal springs) 60 including an upper leaf spring 60U and a lower leaf spring 60L provided on opposite end sides in an optical axis direction of the hollow body portion 11 of the holder 10 for supporting the holder 10 displaceably in the optical axis direction with the holder being positioned in a radial direction thereof; a stopper 70 attached to the holder 10 for sandwichedly support the upper leaf spring 60U between the holder 10 and the stopper 70; a cover 80 and a base 85 which are used as a pair of support frames, respectively, and provided outside of the pair of leaf springs 60 along the optical axis direction and adapted to sandwichedly support the leaf springs 60 between the opposite end surfaces of the yoke 30 and the respective one of the cover 80 and the base 85, both of the cover 80 and the base 85 having opening portions 80a, 85a respectively formed at least on the parts that correspond to the lens assembly 100 attached to the holder 10; and a sheet-like electrode 90 provided between the lower leaf spring 60L and the base 85 for supplying electric power to the coil 20.

Hereinbelow, a description will be made with regard to the details of each of the components mentioned above. In this regard, it should be appreciated that the term "upper", "top" or its equivalent in the subject specification denotes the direction depicted by an arrow in FIG. 2, while the term "lower", "bottom" or its equivalent means the reverse direction.

The holder 10 is a molded component made of synthetic resin. The holder 10 has a hollow body portion 11 of cylindrical configuration having one end (upper end) to which a lens assembly 100 is attached, and an annular flange portion 12 integrally formed along the perimeter of the other end (lower end) of the hollow body portion 11. As illustrated in FIG. 3, the inside of the hollow body portion 11 of the holder 10 is formed into a hollow space. Further, the inner circumference of the hollow body portion 11 is formed with a female thread portion that can be threadedly engaged with a male thread portion provided on the outer circumference of the lens assembly 100. On the peripheral edge of the top surface of the flange portion 12 (the surface to the side of the hollow body portion 11), there is provided a step portion 12a to which the coil 20 is bonded in positioning with the holder 10, as clearly shown in FIG. 3. Furthermore, on the bottom surface of the flange portion 12, a ring-shaped protrusion (step portion) 15 is concentrically formed, which is used for positioning the lower leaf spring 60L with respect to the holder 10. Three small bosses 13 are integrally formed with the protrusion 15 at an equal spacing in such a manner that they can extend in parallel with the optical axis.

As described above, the coil 20 is fixedly secured to the step portion 12a on the upper surface of the flange portion 12 of the holder 10 in a spaced-apart relationship with the outer circumference of the hollow body portion 11 of the holder 10. A coated copper wire is used as the coil 20. This coil 20 is formed by the varying-number-of-winding method wherein a ten times winding layer and a nine times winding layer of the copper wire are alternately laminated one atop the other. The coil 20 is formed into an air core coil having the cross-section of annular shape. The coil 20 is wound in such a manner that the lead portions 21 on the terminal ends of the wound wire can be located to the side of the flange portion 12. Such an air core coil 20 is secured to the step portion 12a on the upper surface of the flange portion 12 of the holder 10 with an adhesive. In this regard, it should be noted that the coil 20 of the present invention is not limited to such a air core described above, and it may be contemplated, for example, to directly wind a coil around the hollow body portion 11 of the holder 10.

Figure 4:
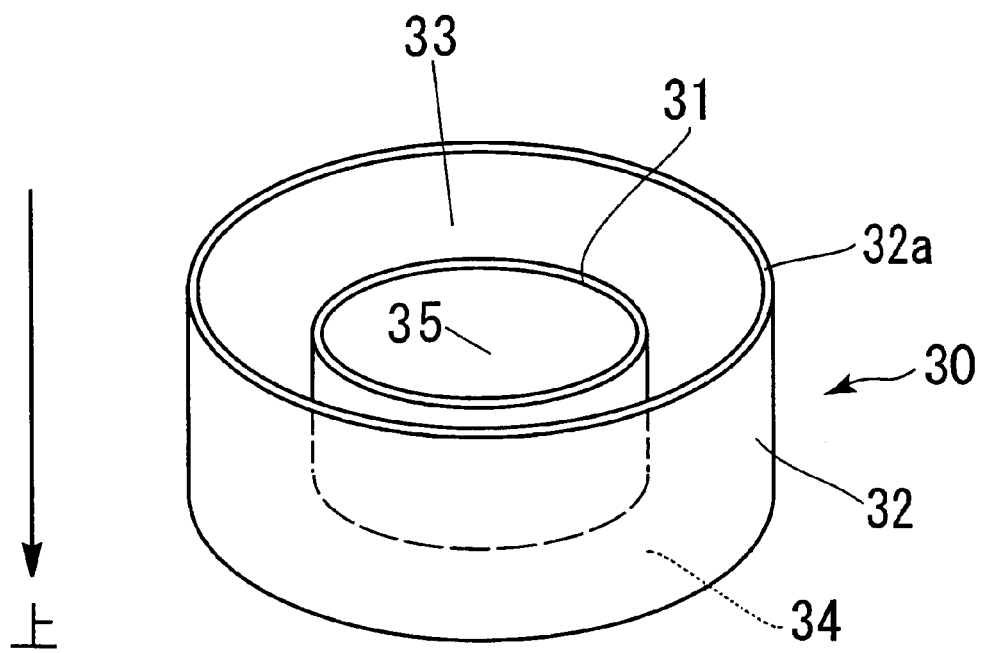
FIG. 4 is a perspective view illustrating a yoke of cylindrical configuration.

Referring to FIG. 4, the yoke 30 includes an inner cylindrical portion 31 of cylindrical shape having an insertion bore 35 into which the hollow body portion 11 of the holder 10 is inserted, an outer cylindrical portion 32 of cylindrical shape provided outside of the inner cylindrical portion 31 with a predetermined spacing left therebetween, and a connecting portion 34 for integrally interconnecting the ends of the inner cylindrical portion 31 and the outer cylindrical portion 32 at opposite side from the flange portion 12 of the holder 10. The yoke 30 is adapted to accommodate the coil 20 within the space of predetermined gap size between the inner cylindrical portion 31 and the outer cylindrical portion 32 of the yoke 30.

The yoke 30 is made of a magnetic material, e.g., iron whose surface is plated with nickel. The hollow body portion 11 of the holder 10 is inserted into the insertion bore 35 of the inner cylindrical portion 31 of the yoke 30 displaceably in the optical axis direction. For this purpose, the insertion bore 35 of the inner cylindrical portion 31 is formed such that it has a diameter greater than the diameter of the outer circumference of the hollow body portion 11 of the holder 10 but smaller than the diameter of the peripheral edge of the flange portion 12 of the holder 10.

Moreover, as illustrated in FIGS. 2 through 4, the yoke 30 is formed so that the height in the optical axis direction of the inner cylindrical portion 31 as measured from the connecting portion 34 is smaller than the height in the optical axis direction of the outer cylindrical portion 32.

A plurality of, e.g., four, permanent magnets 40 are disposed on the magnet mounting surface 33 of the inner circumference of the outer cylindrical portion 32 of the yoke 30 in a spaced-apart confronting relationship with the coil 20. It should be noted that the magnet mounting surface 33 is not limited to the one provided, as described above, on the inner circumference of the outer cylindrical portion 32 of the yoke 30 but may be provided on the outer circumference of the inner cylindrical portion 31, if desired.

Each of the permanent magnets 40 consists of an arcuate permanent magnet extending over a sector of about 90 degrees along the contour of the circular magnet mounting surface 33. The permanent magnets 40 are made of neodymium. Each of permanent magnets 40 is magnetized such that, for example, the curved surface of the respective permanent magnet 40 kept in contact with the magnet mounting surface 33 is a south pole (S-pole) and the opposite curved surface is a north pole (N-pole). The outer circumference of the inner cylindrical portion 31 of the yoke 30 becomes an S-pole as these arcuate permanent magnets 40 are attached to the yoke 30 of cylindrical configuration. This creates a magnetic field that is directed from the arcuate permanent magnets 40 toward the inner cylindrical portion 31. In the event that the coil 20 is supplied with electric power, a force exerts on the coil 20 in the optical axis direction by the interaction between the magnetic field of the permanent magnets and the magnetic field generated by the electric current flowing through the coil 22. This makes it possible that the holder 10, that is, the lens assembly 100 is caused to displace in the optical axis direction. In this regard, it should be noted that the number of the permanent magnets is not particularly limited to four and may be changed to other plural numbers depending on the circumstances. Further, a single permanent magnet of, e.g., C-shape may be employed.

Figure 5:
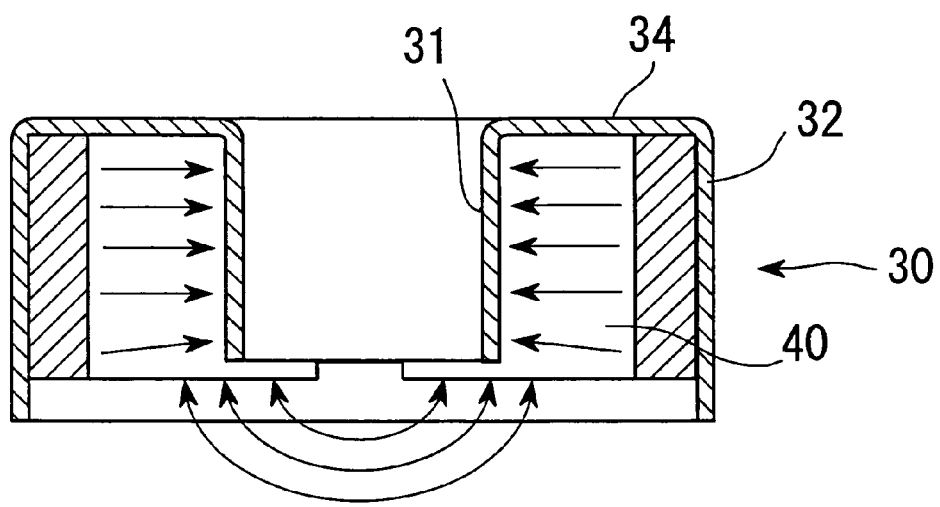
FIG. 5 is a cross-sectional view of the yoke illustrating the state of magnetic field in case that a permanent magnet alone is attached to the yoke.

In the meantime, with the yoke 30 set forth above, the magnetic flux is doomed to be leaked out downwards, as shown by arrows in FIG. 5, between the adjoining permanent magnets 40 at the open side of the cylindrical yoke 30 which is opposite to the connecting portion 34. In order to prevent such a leakage of the magnetic flux, the yoke 30 is provided with a leakage preventing means to enhance the driving force of the holder 10.

Figure 6:
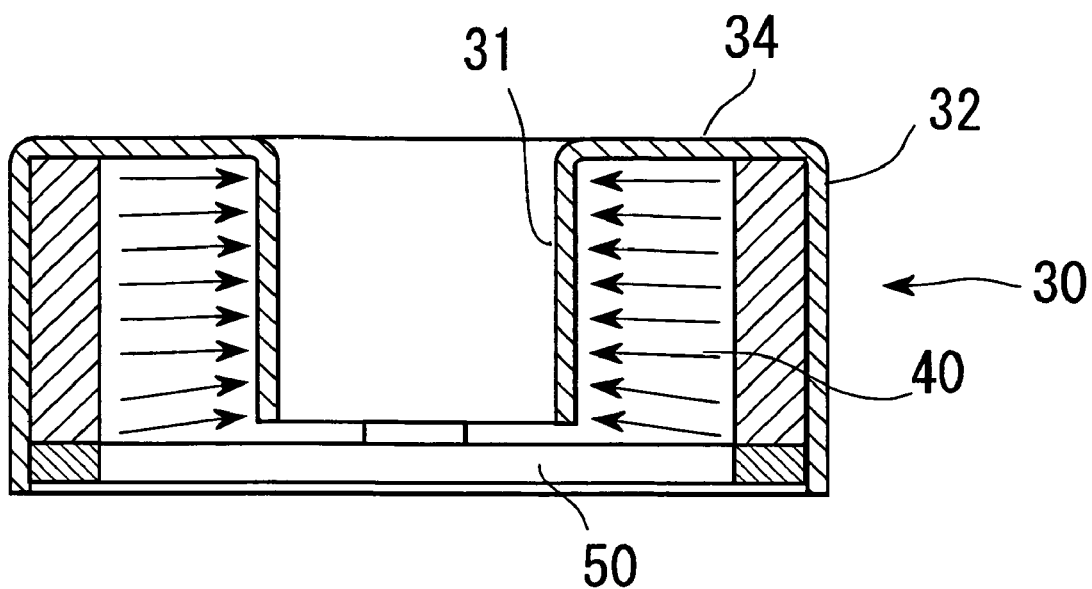
FIG. 6 is a cross-sectional view of the yoke illustrating the state of magnetic field in case that the permanent magnet is attached to the yoke in combination with a magnetic member.

As the leakage inhibitor means, a magnetic member 50 is disposed to interconnect the permanent magnets 40 in such a condition that the magnetic member 50 is kept in contact with the lower end surfaces of the permanent magnets 40, that is, the surfaces of the permanent magnets 40 that are opposite to the surfaces thereof in contact with the connecting portion 34 of the cylindrical yoke 30. As shown in FIG. 6, the magnetic member 50 functions to reduce the amount of the magnetic flux which would otherwise be leaked out downwards. This will increase the magnetic flux that is directed from the permanent magnets 40 toward the inner cylindrical portion 31 of the cylindrical yoke 30. As depicted in to FIG. 7, according to the actuator 1 described above, the magnetic member 50 having an annular ring shape is attracted into contact with the permanent magnets 40 and then bonded to the permanent magnets 40 with an adhesive. Referring back to FIG. 6, the ring-shaped magnetic member 50 has the same width as the radial thickness of the arcuate permanent magnets 40. This allows the coil 20 to be disposed in the yoke 30 with no hindrance. Furthermore, under the state that the magnetic member 50 is attached to the permanent magnets 40, the lower surface of the ring-shaped magnetic member 50 is positioned at an upper elevation than the end surface of the outer cylindrical portion 32 of the yoke 30. This permits the lower leaf spring 60L to be attached to the end surface of the outer cylindrical portion 32 of the yoke 30 with no hindrance. Alternatively, the magnetic member 50 may be so sized that the bottom surface of the magnetic member 50 is flush with the end surface of the outer cylindrical portion 32 of the yoke 30 in the optical axis direction and such a magnetic member 50 is attached to the lower end surfaces of the permanent magnets 40, it becomes possible to utilize the bottom surface of the magnetic member 50 as an additional bonding surface with the lower leaf spring 60L.

In addition, there may a case that the corner portion defined by the magnet mounting surface 33 and the connecting portion 34 of the yoke 30 has a different contour than the corresponding corner portion of the permanent magnets 40. As a result, each of the permanent magnets 40 cannot make surface-to-surface contact with the magnet mounting surface 33 of the yoke 30, thereby reducing the magnetic efficiency. In such a case, another magnetic member 50 may be also inserted between the connecting portion 34 of the yoke 30 and the upper end surfaces of the permanent magnets 40 to thereby assure that the permanent magnets 40 can be brought into surface-to-surface contact with the magnet mounting surface 33 of the yoke 30 regardless of the contour of the corner portion of the yoke 30.

According to the actuator 1 described herein, the magnetic member 50 is made of a cold-rolled steel plate. However, the material for the magnetic member 50 is not particularly limited to steel but may include iron, nickel, cobalt and alloy of these metal elements.

Similarly, in the case of employing a single permanent magnet of, e.g., C-shape, the magnetic member 50 is disposed in contact with the lower end surfaces of the permanent magnets 40. This can suppress leakage of the magnetic flux which would otherwise be leaked out downwards between the opposite circumferential end surfaces of the C-shaped permanent magnet.

Figure 8:
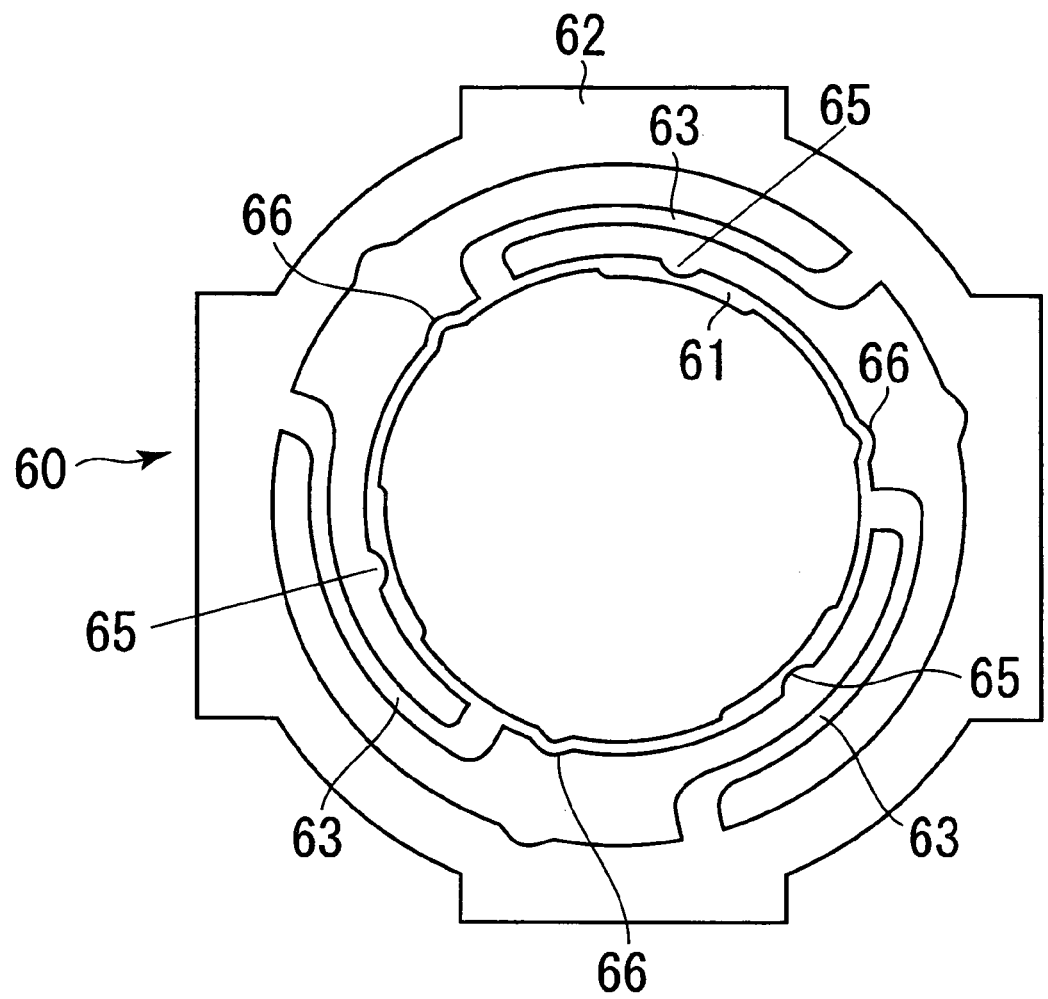
FIG. 8 is a top view illustrating a leaf spring.

Referring to FIG. 8, the leaf springs, namely, the upper leaf spring 60U and the lower leaf spring 60L, are made of a sheet-shaped metal material. Each of the upper leaf spring 60U and the lower leaf spring 60L is in the form of a gimbal spring that has an inner annulus 61, an outer annulus 62 provided in a spaced-apart relationship with the inner annulus 61, and a plurality of bridge portions 63 joining the inner annulus 61 and the outer annulus 62 together. The bridge portions 63 will be elastically deformed if a load is applied to the inner annulus 61 under the state that the outer annulus 62 remains fixedly secured. This means that the upper leaf spring 60U and the lower leaf spring 60L can support the holder 10, to which the inner annulus 61 is bonded, displaceably in the optical axis direction with the holder 10 being positioned in a radial direction thereof (that is, under the condition that radial displacement of the holder 10 is being restricted).

Formed on the top surface of the holder 10 is a step portion 16 that serves to align the upper leaf spring 60U with respect to the holder 10 in the process of assembly. This step portion 16 has a cross-sectional configuration that corresponds to the inner circumferential edge of the inner annulus 61. The upper leaf spring 60U is placed onto the top surface of the holder 10 with the inner annulus 61 thereof coupled to the step portion 16, and further a stopper 70 is attached onto the upper leaf spring 60U. The inner annulus 61 is bonded to the holder 10 under the state that it is sandwiched between the top surface of the holder 10 and the bottom surface of the stopper 70. Likewise, the outer annulus 62 is bonded to the cover 80 and the yoke 30 under the condition that it is sandwiched between the bottom surface of the cover 80 and the top surface of the connecting portion 34 of the yoke 30.

As described above, a step portion 15 for positionally aligning the lower leaf spring 60L in the process of assembly is formed on the bottom surface of the flange portion 12 of the holder 10. This step portion 15 has a cross-sectional configuration that corresponds to the inner circumferential edge of the inner annulus 61. Therefore, the inner annulus 61 is bonded to the holder 10 under the state that it is positionally aligned with respect to the holder 10. Likewise, the outer annulus 62 is bonded to the base 85 and the yoke 30 under the condition that it is sandwiched between the end surface of the outer cylindrical portion 32 of the yoke 30 and the top surface of the base 85.

Figure 9:
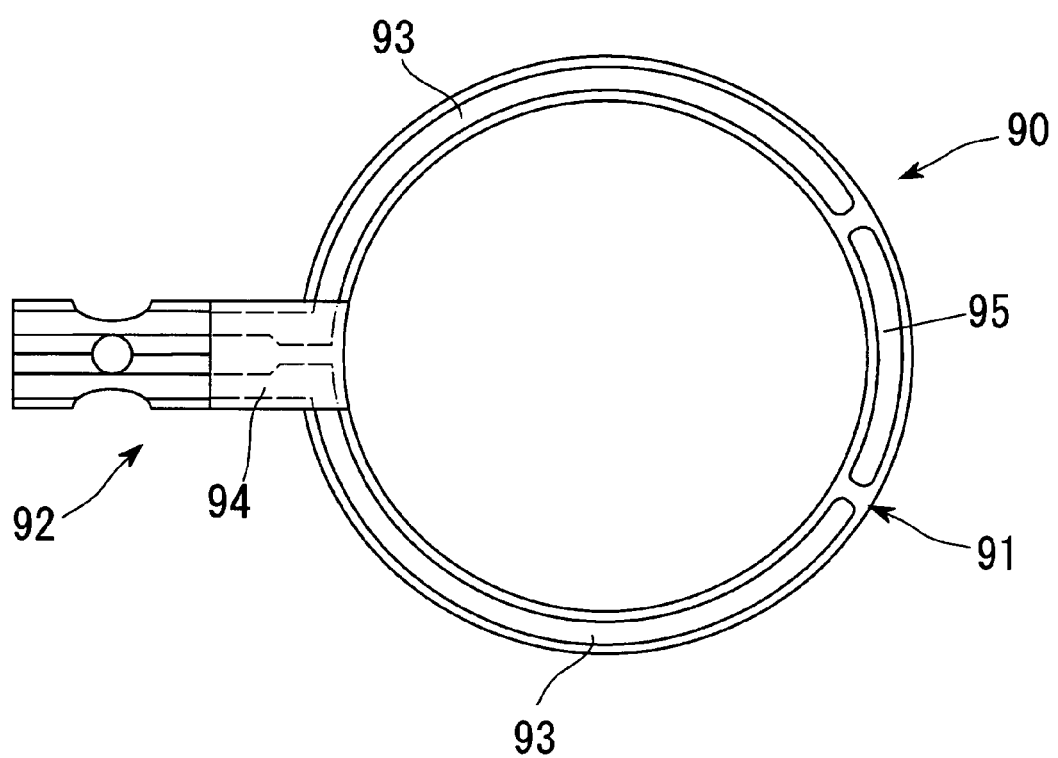
FIG. 9 is a top view illustrating a sheet-like electrode.

As illustrated in FIG. 3, a sheet-like electrode 90 is provided between the lower leaf spring 60L and the base 85 to supply electric power to the coil 20. Referring to FIG. 9, the sheet-like electrode 90 is made of a polyimide sheet, and has a generally circular ring-like portion 91 and an extension portion 92 extending radially outwardly from the ring-like portion 91.

A pair of copper-made terminal portions 93 are formed on one surface of the sheet-like electrode 90 in such a manner that it can extend from the extension portion 92 to the ring-like portion 91. Provided between the frontal ends of the two terminal portions 93 on the ring-like portion 91 is a dummy terminal portion 95 to which a dummy wire 23 described later is soldered.

Adhesive layers (not shown) that function to bond the sheet-like electrode 90 to the bottom surface of the outer annulus 62 of the lower leaf spring 60L are formed on the other surface of the sheet-like electrode 90 at the positions corresponding to the ring-like portion 91, the joining part of the extension portion 92 with the ring-like portion 91 and the frontal end part of the extension portion 92.

The extension portion 92 is adapted to extend to the outside of the support frame through an insert hole 88 of the base 85 described later and then can be connected to a sensor board not shown in the drawings. In order to have the extension portion 92 fitted through the insert hole 88, there is a need to bend the extension portion 92 substantially at a right angle with respect to the ring-like portion 91. A polyimide cover film 94 is provided over the terminal portions 93 for the sake of avoiding any damage of the terminal portions 93 which would otherwise occur during the bending process.

Figure 10:
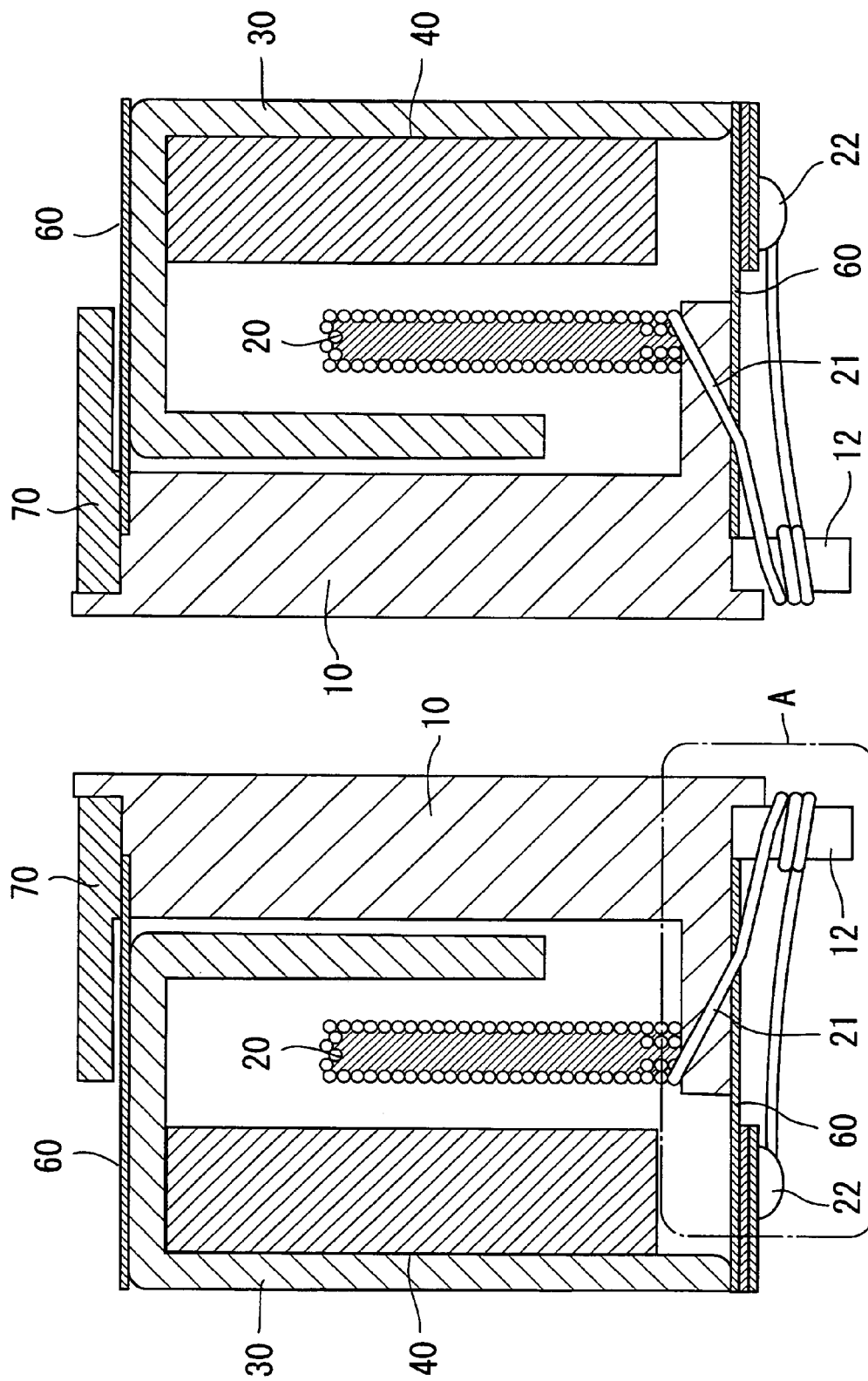
FIG. 10 is a partial schematic cross-sectional view of the autofocus actuator, illustrating the lead portion of a coil connected to the sheet-like electrode.

The two lead portions 21 of the coil 20 are soldered at their front ends to the two terminal portions 93 that are provided on the ring-like portion 91 of the sheet-like electrode 90, thus permitting the electric power to be supplied to the coil 20. In the meantime, the lead portions 21 may make an unwanted contact with other components as the holder 10 is caused to be displaced, and thereby a stress may be concentrated on the soldered front ends of the lead portions 21. In view of this, as illustrated in FIG. 10, base parts of the lead portions 21 of the wire of the coil 20 are respectively wound around two of the three small bosses 13 provided on the step portion 15 of the bottom surface of the flange portion 12 of the holder 10. Subsequently, the front ends of the lead portions 21 are soldered to the terminal portions 93 of the sheet-like electrode 90, respectively.

Each of the bosses 13 is of cylindrical shape and has a height small enough to avoid any contact, in an assembled condition, with the top surface of a bottom plate portion 86 of the base 85 described later.

Each of the lead portions 21 extends from the coil 20 into the bottom surface side of the flange portion 12 of the holder 10 through a recess 14 (see FIG. 12) formed on the peripheral edge of the flange portion 12. Then, the lead portions 21 are respectively wound around the corresponding bosses 13 located in the vicinity of the recess 14.

The lead portions 21 running between the bosses 13 and the soldering portions 22 are provided in a loosened condition to avoid any tensile stress which would otherwise be generated in the lead portions 21 as the holder 10 is caused to be displaced.

Figure 11:
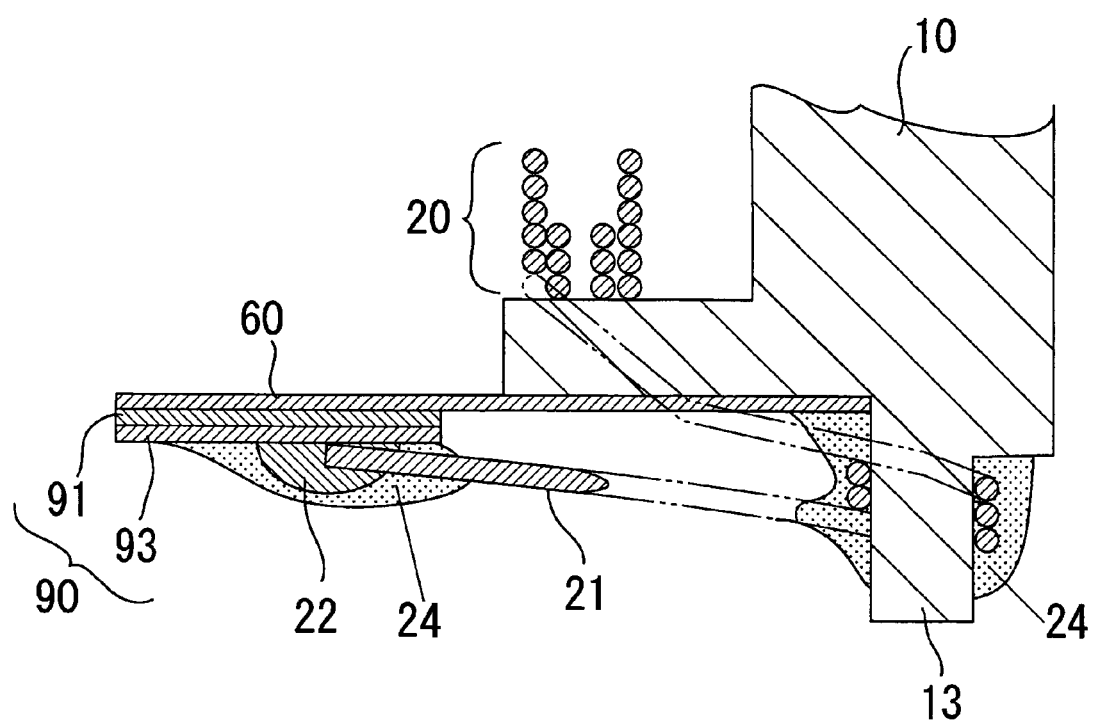
FIG. 11 is an enlarged view illustrating the part indicated by "A" in FIG. 10.

In the camera module 1 described above, as illustrated in FIG. 11, a stress relief agent 24 is applied to cover both the winding parts where the lead portions 21 are wound around the bosses 13 of the holder 10 and the soldering parts 22 where the front ends of the lead portions 21 are soldered to the terminal portions 93 of the sheet-like electrode 90. This helps prevent the stress from concentrating on a local part of each lead portion 21.

Figure 12:
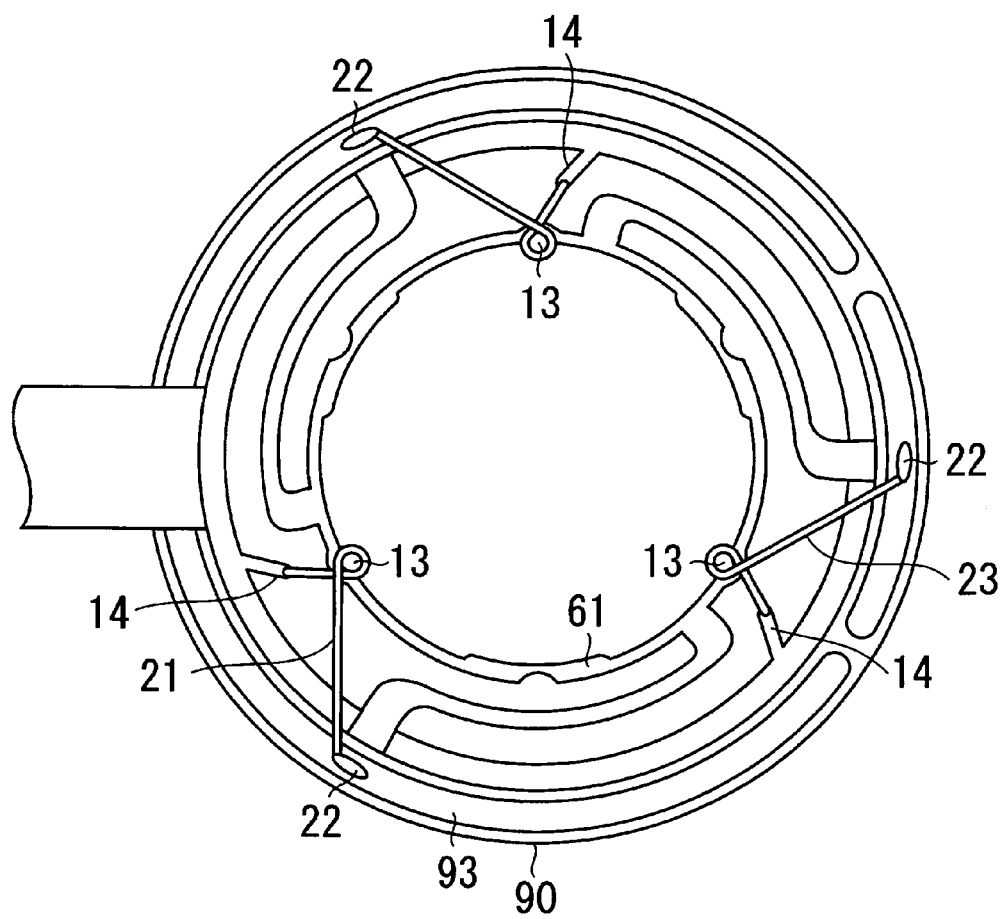
FIG. 12 is a top view showing the positional relationship between the flange portion of the holder, the lead portion of the coil and the sheet-like electrode.

Referring to FIG. 12, the bosses 13 are three in number and provided on the bottom surface of the flange portion 12 substantially at an equal spacing. Each of the three bosses 13 is inserted through a semicircular recess 66 (see FIG. 8) that lies on the inner edge of the inner annulus 61 of the lower leaf spring 60L bonded to the bottom surface of the flange portion 12.

As described above, the lead portions 21 of the coil 20 are wound around two of the three bosses 13. The remaining one boss 13 is used to support a balance keeping means.

The balance keeping means comprises a dummy wire 23 which is the same as that used in the coil 20. One end of the dummy wire 23 is wound on the corresponding boss 13, while the other end thereof is soldered to the dummy terminal portion 95 of the sheet-like electrode 90. This assures that the weight of the holder 10 is well balanced, thereby making it possible to displace the holder 10 in the optical axis direction with a stabilized posture.

A stress relief agent 24 is also applied to the dummy wire 23 so as to cover both the winding part wound on the boss 13 and the soldering part of the dummy wire 23. This helps prevent the stress from concentrating on a local part of the dummy wire 23 and assists in balancing the weight of the holder 10.

It should be noted that the actuator 1 is not particularly limited to the use of the above-mentioned sheet-like electrode 90. For example, if desired, a terminal portion for connection with the power source may be formed, by use of an insulating material, on a part of the bottom surface (the opposite surface from the holder 10) of the outer annulus 62 of the lower leaf spring 60L that is not displaced in accordance with the displacement of the holder 10, and then the front ends of the lead portions 21 of the coil 20 may be connected to the terminal portion so formed.

Figure 13:
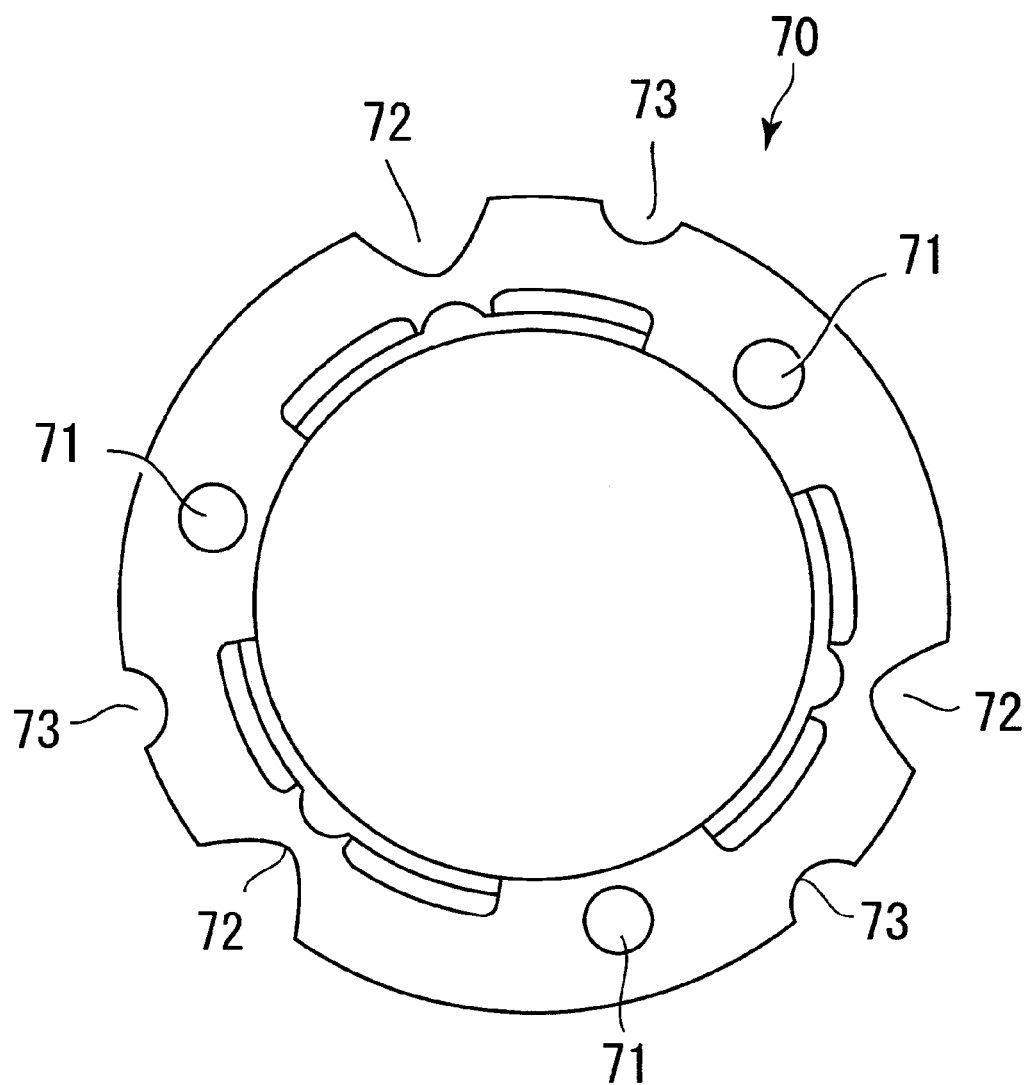
FIG. 13 is a top view of a stopper.

Referring to FIG. 13, the stopper 70 is made of synthetic resin in the form of a ring and will be subjected to bonding under the state that the inner annulus 61 of the upper leaf spring 60U is sandwiched between the holder 10 and the stopper 70.

The stopper 70 is assembled in such a manner that a part of the edge of each of three apertures 71 is in exact alignment with the contour of each of the semicircular recesses 65 (see FIG. 8) formed on the peripheral edge of the inner annulus 61 of the upper leaf spring 60U. This makes it possible to ascertain the clearance between the hollow body portion 11 of the holder 10 and the inner cylindrical portion 31 of the yoke 30 by seeing through the apertures 71 and the semicircular recesses 65 from the top.

Referring back to FIG. 2, the upper leaf spring 60U is assembled such that a part of the outer annulus 62 of the upper leaf spring 60U can be sandwiched between the connecting portion 34 of the yoke 30 and the cover 80. The cover 80 is provided with a generally rectangular top plate portion 81 having an opening 80a and a plurality of post portions 82 respectively formed at the corners of the top plate portion 81 in such a manner that the post portions 82 extend vertically downwardly from the top plate portion 81.

The lower leaf spring 60L is assembled such that a part of the outer annulus 62 of the lower leaf spring 60L can be sandwiched between the end surface of the outer cylindrical portion 32 of the yoke 30 and the base 85. The base 85 is provided with a generally rectangular bottom plate portion 86 having an opening 85a and a plurality of post portions 87 respectively formed at the corners of the bottom plate portion 86 in such a manner that the post portions 87 extend vertically upwardly from the bottom plate portion 86.

The post portions 82 of the cover 80 and the post portions 87 of the base 85 correspond in their positions and are insertedly coupled with each other. This allows the cover 80 and the base 85 to be readily aligned in the process of assembly and then bonded together.

Figure 14:
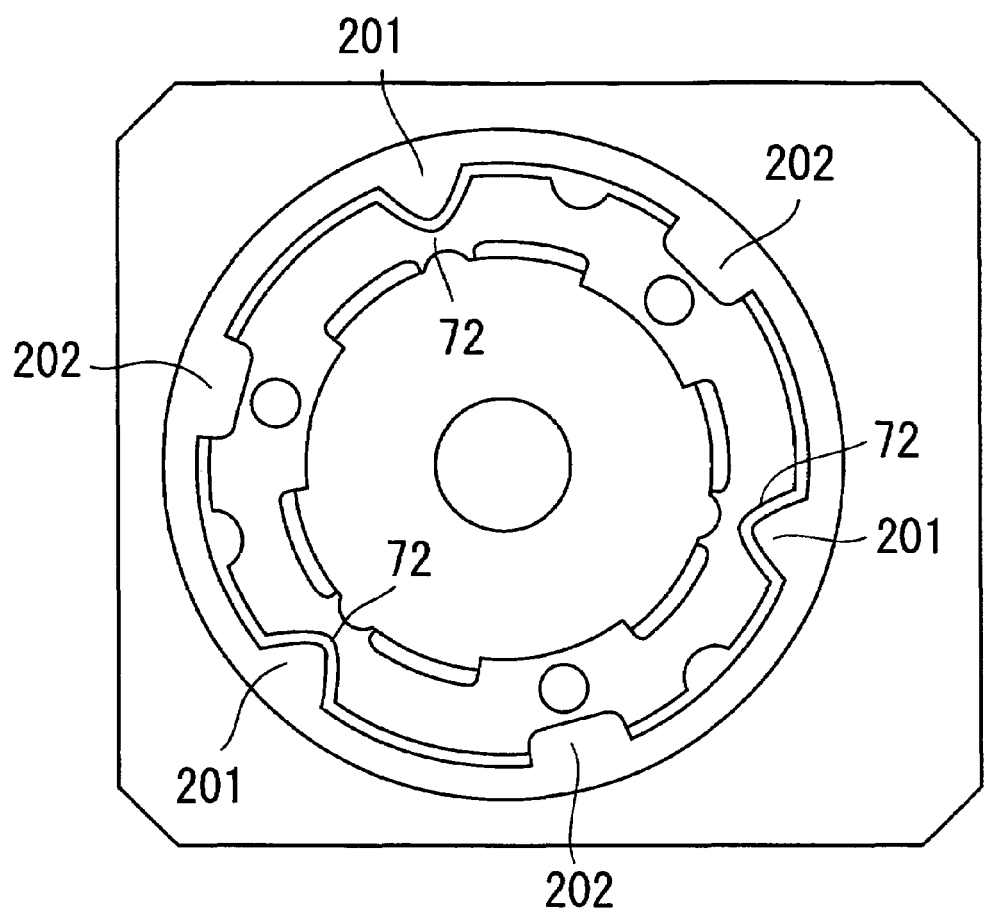
FIG. 14 is a top view showing the positional relationship between the opening portion of a cover and the stopper.

Turning to FIG. 14, three protrusions 201 of generally triangular shape are provided along the inner edge of the opening 80a of the cover 80. These three protrusions 201 are so disposed that they can be insertedly coupled with three recesses 72 of generally triangular configuration formed along the outer edge of the stopper 70, with a gap left therebetween. This helps prevent any movement in the circumferential direction of the holder 10 that remains bonded to the stopper 70. Accordingly, it becomes possible to have the lens assembly 100 threadedly coupled to the holder 10 with ease in the process of assembly, without having to cause such problems as plastic deformation of the bridge portions 63 of the leaf springs 60, peeling-off of the contact surfaces between the individual components and severing-apart of the lead portions 21 of the coil 20.

Provided above the outer edge of the stopper 70 are lug portions 202 each projecting radially inwardly from the opening 80a. These lug portions 202 are adapted to abut against the stopper 70 to thereby suppress any unwanted displacement of the holder 10 in such an instance that a great magnitude of force exerts on the holder 10 by a dropping shock, etc. This also helps avoid plastic deformation of the bridge portions 63 of the leaf springs 60 supporting the holder 10, peeling-off of the contact surfaces between the individual components and severing-apart of the lead portions 21 of the coil 20.

As shown in FIG. 2, the bottom plate portion 86 of the base 85 has an insert hole 88 through which the extension portion 92 of the sheet-like electrode 90 passes in the process of assembly.

Referring to FIG. 3, three projections 89 are integrally formed on the bottom plate portion 86 of the base 85 in the vicinity of the opening 85a and at a generally equal spacing in the circumferential direction. When assembled, the distal ends of the projections 89 remain in contact with the bottom surface of the flange portion 12 of the holder 10, for example. The height of each projection 89 is greater than the distance between the top surface of the bottom plate portion 86 of the base 85 and the lower leaf spring 60L. This means that the holder 10 is kept displaced in the upward direction. As a result, a resilient force is downwardly exerting on the respective leaf springs 60U and 60L that support the holder 10, thereby normally applying a back tension to the holder 10.

As illustrated in FIG. 2, three circular holes 86a are formed through the bottom plate portion 86 of the base 85 along the circumference of the opening 85a at a generally equal spacing. The condition of the soldering portion 22 on the sheet-like electrode 90 can be observed through the circular holes 86a from the outside of the base 85.

Hereinbelow, a description will be made with regard to the steps of assembling the autofocus actuator described above.

(1) The coil 20 is adhesively affixed to the step portion 12a on the top surface of the flange portion 12 of the holder 10.

(2) Next, four pieces of the permanent magnets 40 are arranged in predetermined positions and bonded to the magnet mounting surface 33 on the inner circumference of the outer cylindrical portion 32 of the yoke 30 with an adhesive. Under this state, the magnetic member 50 is attracted into contact with the bottom end surfaces of the permanent magnets 40 and then bonded thereto.

(3) Next, the holder 10 to which the coil 20 has been affixed assembled with the yoke 30 on which the magnetic member 50 has been mounted in the preceding step. At this time, the hollow body portion 11 of the holder 10 is inserted into the insertion bore 35 of the inner cylindrical portion 31 of the yoke 30. The holder 10 and the yoke 30 are assembled such that the coil 20 can be accommodated within the space between the outer circumference of the inner cylindrical portion 31 of the yoke 30 and the permanent magnets 40.

(4) Next, under the state of step (3), the inner annuluses 61 of the respective leaf springs 60U and 60L are insertedly coupled with the top and bottom step portions 15, 16 of the holder 10, respectively, and then bonded thereto with an adhesive.

(5) Next, the stopper 70 is adhesively secured to the top surface of the upper leaf spring 60U already bonded at step (4) in a condition that the inner annulus 61 of the upper leaf spring 60U is sandwiched between the top surface of the hollow body portion 11 of the holder 10 and the stopper 70.

(6) Next, the ring-like portion 91 of the sheet-like electrode 90 is bonded, by way of its adhesive layer, to the outer annulus 62 of the lower leaf spring 60L already bonded at step (4).

(7) Next, the lead portions 21 of the coil 20 and the dummy wire 23 are wound around the bosses 13 of the holder 10. Then, the front ends of the lead portion 21 and the dummy wire 23 are soldered to the terminal portions 93 of the sheet-like electrode 90 already bonded at step (6) and the dummy terminal portion 95, after which a stress relief agent 24 is applied to the winding parts of the bosses 13 and the soldering parts 22.

(8) Next, the cover 80 and the base 85 are attached to the assembly obtained at step (7) in such a manner that they can sandwich the outer annuluses 62 of the respective leaf springs 60U, 60L between the yoke 30 and themselves. The outer annulus 62 of the upper leaf spring 60U, which lies between the yoke 30 and the cover 80, is then bonded to the yoke 30 and the cover 80. Likewise, the outer annulus 62 of the lower leaf spring 60L, which lies between the bottom end surface of the outer cylindrical portion 32 of the yoke 30 and the base 85, is bonded to the bottom end surface of the outer cylindrical portion 32 of the yoke 30 and the base 85. At this moment, the extension portion 92 of the sheet-like electrode 90 is extended to the outside through the insert hole 88 of the base 85.

(9) Next, the lens assembly 100 is threadedly coupled with the thread portion of the holder 10 of the assembly assembled up to step (8).

Hereinbelow, an operation of the autofocus actuator 1 described above will now be described.

As viewed in FIG. 3, the magnetic field is caused to direct from the permanent magnets 40 to the inner cylindrical portion 31 of the yoke 30. If the holder 10 assumes its initial position and electric current flows in the counterclockwise direction as the coil 20 is viewed from the top, an upwardly exerting electromagnetic force is generated in the coil 20, i.e., the holder 10. This enables the holder 10 to be displaced until the electromagnetic force comes into balance with the resilient force of the leaf springs 60 that varies depending on the displacement of the holder 10. The electromagnetic force is controlled by the magnitude of the electric current flowing through the coil 20, meaning that the holder 10 and hence the lens assembly 100 can be displaced to a desired position by controlling the amount of the electric current. With the autofocus actuator 1, the information on the position of the lens assembly 100 can be obtained from the amount of the electric current flowing through the coil 20, while the information on the image can be detected by use of a detector element (not shown) located below the autofocus actuator 1. The autofocus position is specifically defined by way of speedily calculating the positional information and the image information in an operation part equipped with a predetermined autofocus algorithm. The autofocus actuator 1 can perform the autofocusing operation by controlling the electric current flowing through the coil 20 based on the result so calculated.

Figure 15:
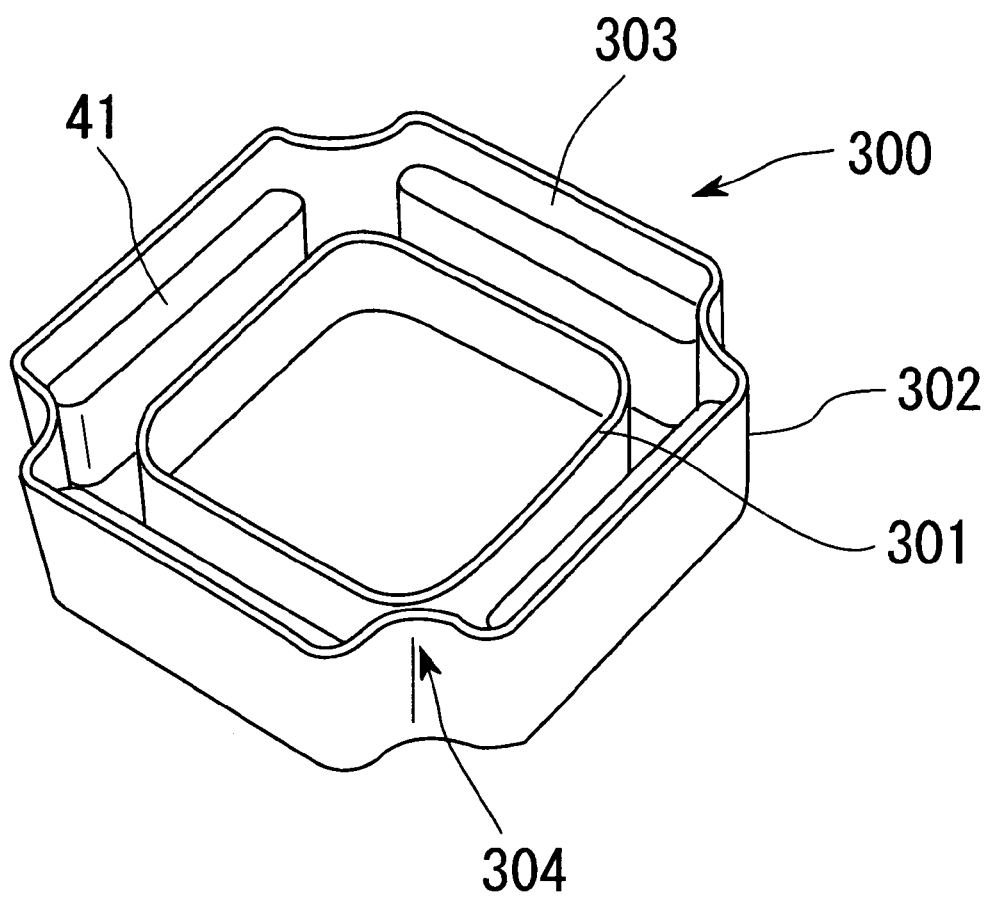
FIG. 15 is a perspective view of a generally square yoke, showing the condition that generally plate-shaped permanent magnets are attached to the yoke.
Figure 16:
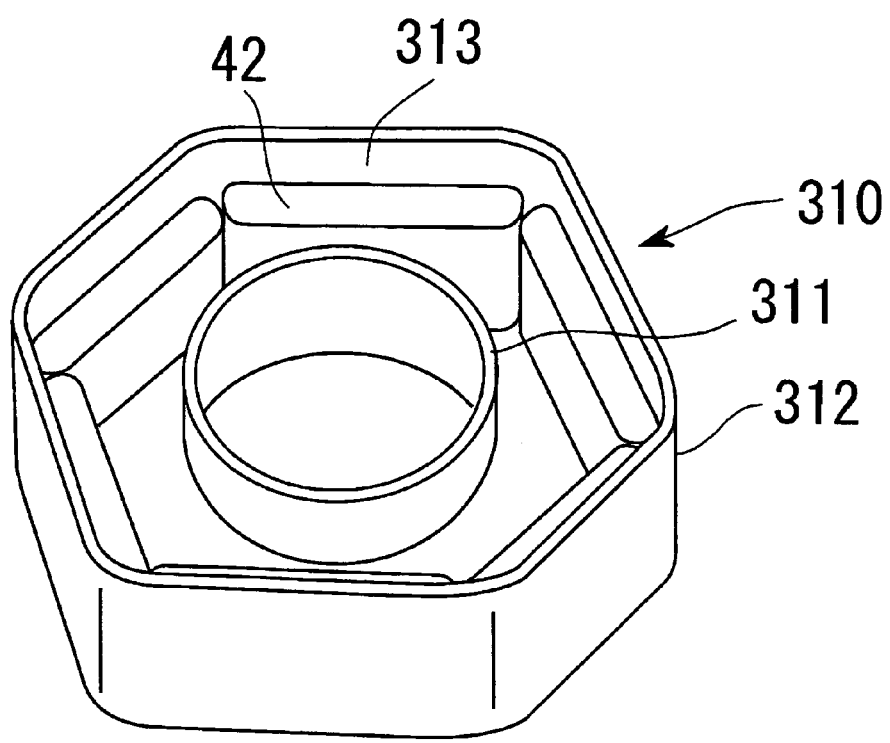
FIG. 16 is a perspective view of a generally hexagonal yoke, showing the condition that generally plate-shaped permanent magnets are attached to the yoke.
Figure 17:
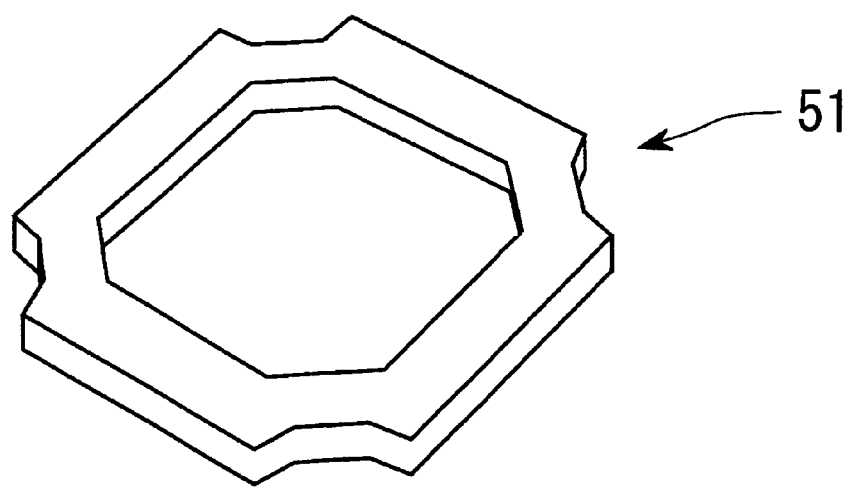
FIG. 17 is a perspective view illustrating a magnetic member of generally square ring shape.

In the autofocus actuator 1 described above, it should be understood that the yoke 30, the permanent magnets 40 and the magnetic member 50 described above with reference to FIGS. 1 through 14 can be modified into the ones as illustrated in FIGS. 15 through 17. A modified example of the yoke 30 will be described below with reference to FIGS. 15 through 17.

According to the autofocus actuator 1 described above and shown in FIGS. 1 through 14, the yoke 30 is formed into a cylindrical shape. In accordance with this, each of the permanent magnets 40 is curved in the form of an arc to follow the contour of the yoke 30. The permanent magnets 40 with such configuration involve problems in that they are costly, a specially designed jig for positioning these magnets with respect to the yoke 30 is needed, and a manufacturing process is complicated.

As a modified example of the yoke that permits the use of permanent magnets of rectangular parallelepiped, namely, flat plate shape and allows easier alignment and assembly, there is provided a yoke 300 which includes an outer cylindrical portion 302 having a generally square cross-sectional shape, as illustrated in FIG. 15.

Referring to FIG. 15, four magnet mounting surfaces 303 are provided on the inner circumference of the outer cylindrical portion 302. With this yoke 300, four permanent magnets 41 each having a generally flat plate shape, which can be produced with little difficulty, are attracted into contact with and affixed to the corresponding magnet mounting surfaces 303.

Moreover, as illustrated in FIG. 15, formed on the four corners of the outer cylindrical portion 302 are cave-in portions 304 each of which is curved inwardly. The distance between the inner surfaces of the adjacent two cave-in portions 304 lying at opposite sides of one of the magnet mounting surfaces 303 is substantially equal to the width of the generally flat plate shape permanent magnets 41. This makes sure that the inner surfaces of each of the cave-in portions 304 can be in contact with the side surfaces of the respective permanent magnets 41, thus allowing the permanent magnets 41 to be aligned in position with ease.

Each of the generally flat plate shape permanent magnets 41 is magnetized such that, for example, the back surface thereof remaining in touch with the magnet mounting surfaces 303 becomes an S-pole, while the front surface opposite to the S-pole back surface serves as an N-pole. The generally flat plate shape permanent magnets 41 are attached to the outer cylindrical portion 302 of the yoke 300 which has a generally square shape cross section. As a result, the outer circumference of the inner cylindrical portion 301 becomes an S-pole, assuring that a magnetic field is created to direct from the generally flat plate shape permanent magnets 41 toward the inner cylindrical portion 301.

According to this modified example, the inner cylindrical portion 301 of the generally square yoke 300 is also formed into a configuration having a generally square cross-section. For this reason, a coil wound in a generally square shape is employed as the coil that will be accommodated between the inner cylindrical portion 301 and the generally flat plate shape permanent magnets 41 with a spacing left therebetween. By way of this arrangement, the direction of the electric current flowing through the coil is orthogonal to the direction of the magnetic field created within the generally square yoke 300, thereby making it possible to acquire a sufficiently great magnitude of driving force. In this regard, it should be noted that this modified example is not particularly limited to the coil wound in the generally square shape. For instance, other type of coils with different cross-sectional shape may be used as far as they can generate a driving force in the optical axis direction with no likelihood of contact with other components as the coils are received and displaced in the space of predetermined gap size of the yoke 300.

Figure 7:
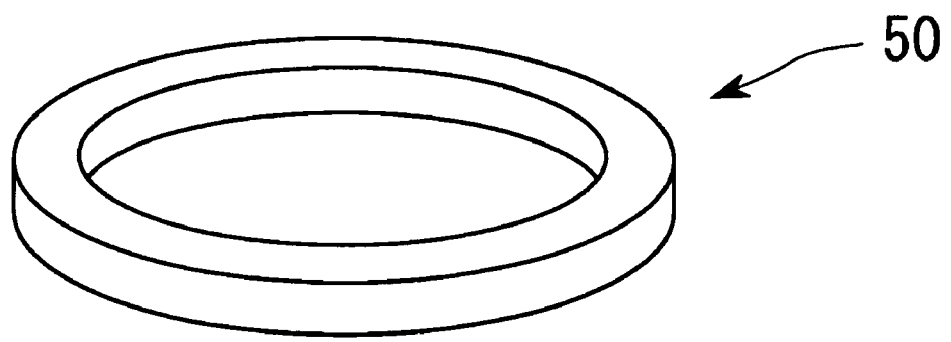
FIG. 7 is a perspective view illustrating the magnetic member of annular ring shape.

In the case of the generally square shape yoke 300 being used as in the above description, there is a need to employ a generally rectangular ring-shaped magnetic member 51 that has inwardly curved cave-in portions formed at the peripheral edges of the four corner parts, as illustrated in FIG. 7. Other parts of the magnetic member 51 than the cave-in portions have the same width as the thickness of the generally flat plate shape permanent magnet 41.

As another modified example of the yoke that permits the use of permanent magnets of flat plate shape and allows easier alignment and assembly, there is provided a yoke 310 which includes an outer cylindrical portion 312 having a generally hexagonal cross-sectional shape, as illustrated in FIG. 16.

Referring to FIG. 16, six magnet mounting surfaces 313 are provided on the outer cylindrical portion 312 of the yoke 310. With this yoke 310, six permanent magnets 42 of generally flat plate shape, which can be produced with little difficulty, are attracted into contact with and affixed to the corresponding magnet mounting surfaces 313.

As can be seen in FIG. 16, the magnet mounting surfaces 313 in this yoke 310 are provided such that the adjacent permanent magnets 42 of generally flat board shape can be in partial contact with one another. This ensures that the six permanent magnets 42 of generally flat plate shape can be aligned with ease and attached to the magnet mounting surfaces 313.

Each of the generally flat plate shape permanent magnets 42 is magnetized such that, for example, the back surface thereof remaining in touch with the magnet mounting surfaces 313 becomes an S-pole, while the front surface opposite to the S-pole back surface serves as an N-pole. These permanent magnets 42 are attached to the outer cylindrical portion 312 of the yoke 310 having a generally hexagonal cross-sectional shape. As a result, the outer circumference of the inner cylindrical portion 311 becomes an S-pole, assuring that a magnetic field is created to direct from the permanent magnets 42 toward the inner cylindrical portion 311.

According to this modified example, the inner cylindrical portion 311 of the generally hexagonal yoke 310 is formed into a configuration having a generally circular cross-section. For this reason, a coil wound in a generally circular shape is employed as the coil that will be accommodated between the inner cylindrical portion 311 and the generally flat plate shape permanent magnets 42 with a spacing left therebetween. These permanent magnets 42 are arranged in the generally hexagonal pattern similar to a circle, meaning that a sufficiently great magnitude of driving force can be acquired by use of the generally circular coil.

In the case of the generally hexagonal yoke 310 being used as noted above, there is a need to employ a hexagonal ring-shaped magnetic member as the magnetic member described. The width of the hexagonal magnetic member 51 is equal to the thickness of each of the permanent magnets 42.

Now, a preferred embodiment of the yoke for the autofocus actuator according to the present invention will be described in detail. The present invention is directed to an improvement of the outer cylindrical portion of the yoke for use in the autofocus actuator 1 shown in FIGS. 1 through 14. In this regard, it should be noted that, with regard to other construction than the yoke, the construction of the above-mentioned actuator is applicable. Therefore, the following description will proceed by, if needed, referring back to the components of the autofocus actuator 1 shown in FIGS. 1 through 14.

Figure 18:
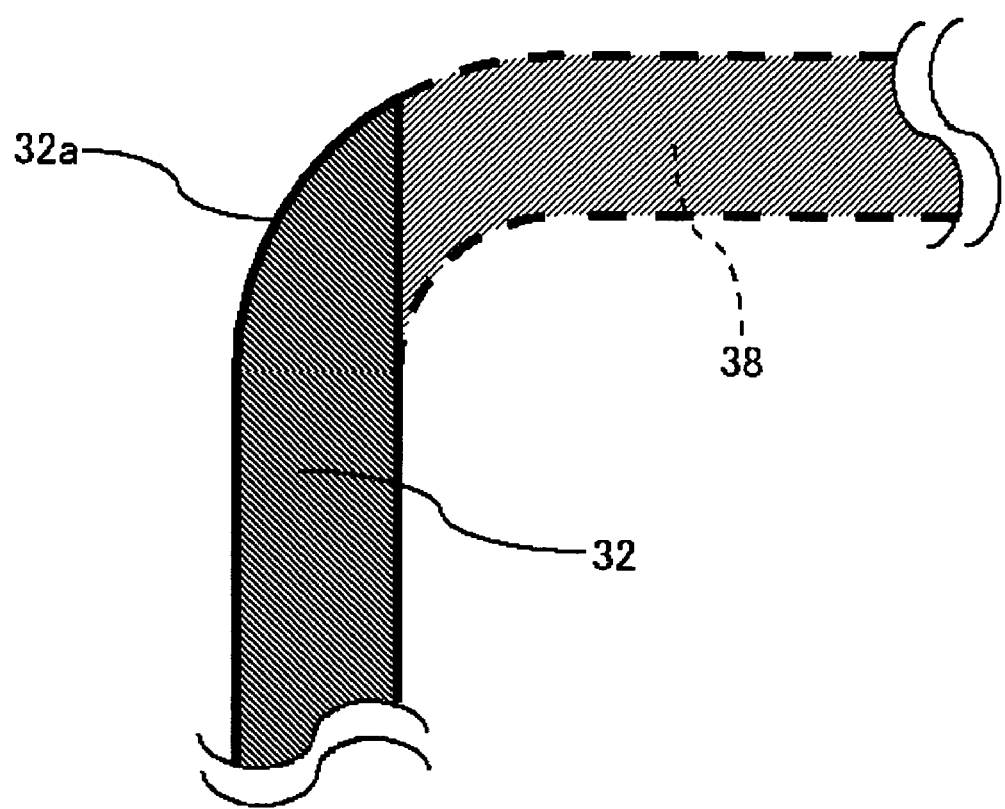
FIG. 18 is a cross-sectional view illustrating the end surface of the outer cylindrical portion of the yoke shown in FIG. 4.

The yoke 30 of cylindrical shape described above and shown in FIG. 4 is formed through the steps of, as illustrated in FIG. 18, bending and drawing a thin plate into a predetermined configuration and then cutting away the waste part 38 (indicated in broken lines) in a press forming process by use of a mold. As a result, the end surface 32a of the outer cylindrical portion 32 of the yoke 30 has a curvilinear shape in cross-section, as indicated with solid lines in FIG. 18, which leads to insufficient flatness and smoothness of a bonding surface. In addition, the end surface 32a of the outer cylindrical portion 32 makes contact with the outer annulus 62 of the lower leaf spring 60L at a reduced area. This makes it difficult to provide a sufficient bonding strength, as a result of which the leaf springs 60 may be detached or dislocated in the event that a shock is applied to the autofocus actuator 1.

In an effort to remove such problems, the present inventor has conceived a yoke that has an increased contact surface with the leaf springs 60, provides a sufficient bonding strength, and allows an easier alignment with the support frame (cover 80 and base 85). As a preferred embodiment of such yoke, there is shown in FIG. 19 a yoke 320 with an increased bonding surface which is provided with an increased bonding surface to which the outer annulus 62 of the lower leaf spring 60L is to be bonded with an adhesive.

Figure 19:
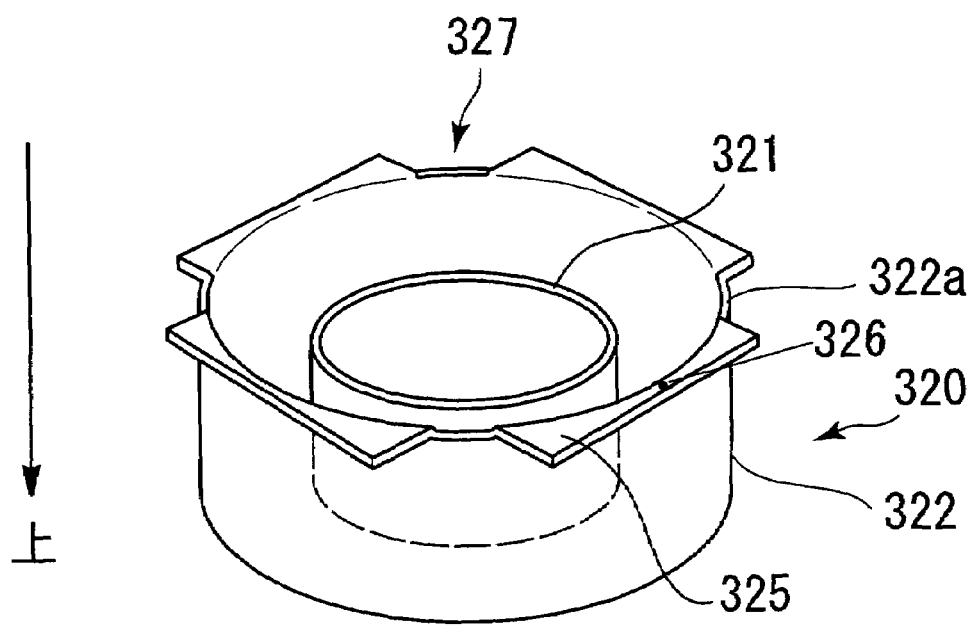
FIG. 19 is a perspective view illustrating a yoke with a tab in accordance with the present invention.

Referring to FIG. 19, just like the yoke 30 described above, the yoke 320 with an increased bonding surface comprises an inner cylindrical portion 321 having an insertion bore 323 into which the hollow body portion 11 of the holder 10 is adapted to be received, an outer cylindrical portion 322 provided outside of the inner cylindrical portion 321 with a predetermined spacing left therebetween, and a connecting portion 324 for integrally interconnecting the ends of the inner cylindrical portion 321 and the outer cylindrical portion 322 at opposite side from the flange portion 12 of the holder 10. Moreover, the yoke 320 is adapted to accommodate the coil 20 within the space of predetermined gap size between the inner cylindrical portion 321 and the outer cylindrical portion 322.

On the end surface 322a of the outer cylindrical portion 322 of the yoke 320 which is opposite to the connecting portion 324, there is integrally formed an increased bonding surface that serves to adhesively retain the outer annulus 62 of the leaf spring (60L). The increased bonding surface is comprised of tab-shaped portions 325 which are integrally formed with the end surface 322a of the outer cylindrical portion 322 so that the tab-shaped portions 325 are flush with the end surface 322a and extend outwardly therefrom.

Figure 20:
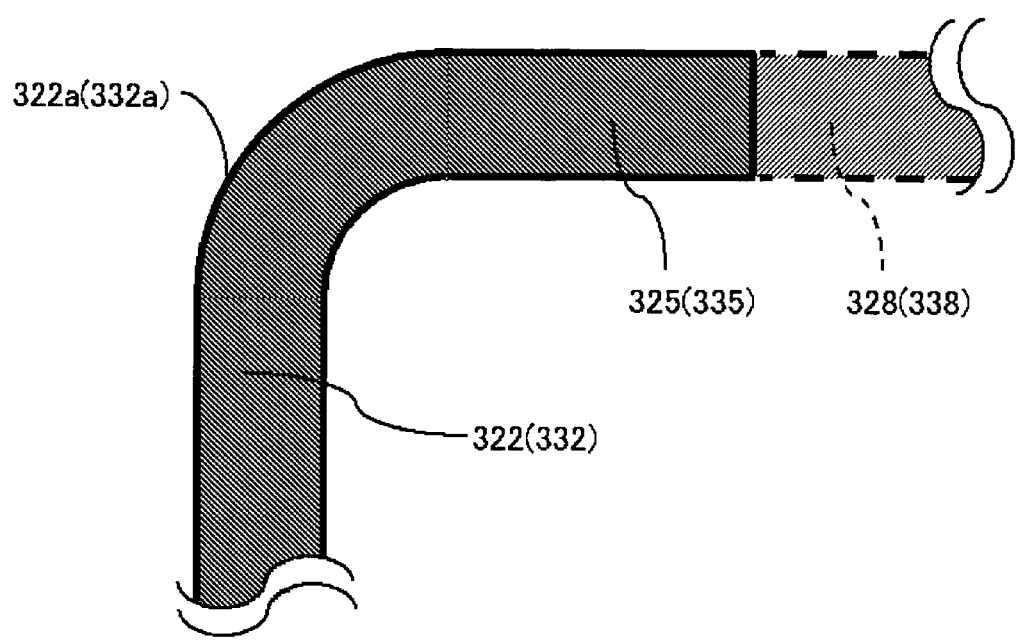
FIG. 20 is a cross-sectional view illustrating the end surface of the outer cylindrical portion and the tab-shaped portions of the yokes shown in FIGS. 19 and 21.

Referring to FIG. 20, just like the yoke 30 described above, the yoke 320 is formed through the steps of bending and drawing a thin plate into a predetermined configuration including the tab-shaped portions 325 and then cutting away the waste part 328 (indicated in broken lines) in a press forming process. The yoke 320 can be produced with ease due to the fact that the tab-shaped portions 325 are integrally formed with the outer cylindrical portion 322 of the yoke 320.

The cross-section of the tab-shaped portions 325 are of such configuration as illustrated with solid lines in FIG. 20. Therefore, according to this improved yoke 320, it is possible to provide a sufficient bonding area to be bonded to the lower leaf spring 60L without taking the smoothness and flatness of the surface of the end surface 322a of the outer cylindrical portion 322 as discussed with reference to FIG. 18.

The tab-shaped portions 325 are four in number and are disposed along the outer circumference of the end surface 322a of the outer cylindrical portion 322 of the yoke 320 at an angular spacing of about 90 degrees.

The surfaces of the tab-shaped portions 325 that make contact with the outer annulus 62 of the lower leaf spring 60L are in a generally parallel relationship with the top surface of the connecting portion 324 of the yoke 320. And, the four tab-shaped portions 325 are provided around the end surface 322a of the outer cylindrical portion 322 at an angular spacing of about 90 degrees. This assures that the yoke 320 can make contact with the lower leaf spring 60L at a broader area than the bottom end surface of the outer cylindrical portion 32 of the afore-mentioned yoke 30 does. Accordingly, the yoke 320 has the ability to adhesively retain the outer annulus 62 of the lower leaf spring 60L in a more stable and reliable manner. This increases the bonding strength between the yoke 320 and the lower leaf spring 60L, thereby preventing the possibility that the leaf springs may be detached or dislocated when a shock is applied to the autofocus actuator 1.

The peripheral edge of each of the tab-shaped portions 325 is of rectilinear shape and has a contact point 326, at the widthwise center of the respective tab-shaped portion, where the peripheral edge meets with the arc of the outer cylindrical portion 322. Namely, the peripheral edge of each of the tab-shaped portions 325 is substantially in coincide with a tangential line of the arc of the outer cylindrical portion 322 of the yoke 320 at the contact point 326. This means that the width spanning the two contact points 326 of the mutually confronting tab-shaped portions 325 of the bonding surface-added yoke 320 is the same as the diametric width of the cylindrical yoke 30 noted above. Accordingly, the bonding area between the outer annulus 62 of the lower leaf spring 60L and the yoke 320 can be increased without having to change the overall size (that is, the maximum diameter) of the yoke 320 as compared to the case of using the cylindrical yoke 30.

The four tab-shaped portions 325 of the yoke 320 are so shaped and sized as to leave concave portions 327 between the adjacent tab-shaped portions 325. The post portions 82 of the cover 80 and the post portions 87 of the base 85 are positioned within the recess 327 in the process of assembly, thereby positioning the yoke 320 with respect to the cover 80 and the base 85.

As shown in FIG. 8, the peripheral edge of the outer annulus 62 of the leaf springs 60 is so configured as to have the same shape as the peripheral edge of the tab-shaped portions 325. This helps aligning the lower leaf spring 60L with respect to the yoke 320.

In accordance with the autofocus actuator of the preferred embodiment of the present invention described above, the outer annulus 62 of the lower leaf spring 60L is bonded both to the end surface 322a of the outer cylindrical portion 322 and the tab-shaped portions 325. As a result, the leaf springs can be bonded to the yoke 320 in more stable and reliable manner, as compared to the case that the leaf springs are bonded only to the end surface 32a of the outer cylindrical portion 32 of the yoke 30 as in the autofocus actuator 1 on which the present invention is based. The tab-shaped portions 325 can be formed on the yoke 320 with the same maximum diameter as that of the cylindrical yoke 30. Further, the yoke 320 can be produced with ease through an integral forming process. Furthermore, in the process of assembly, the lower leaf spring 60L and the yoke 320 can be aligned with the cover 80 and the base 85 by positioning the post portions 82, 87 of the cover 80 and the base 85 within the concave portions 327.

Figure 21:
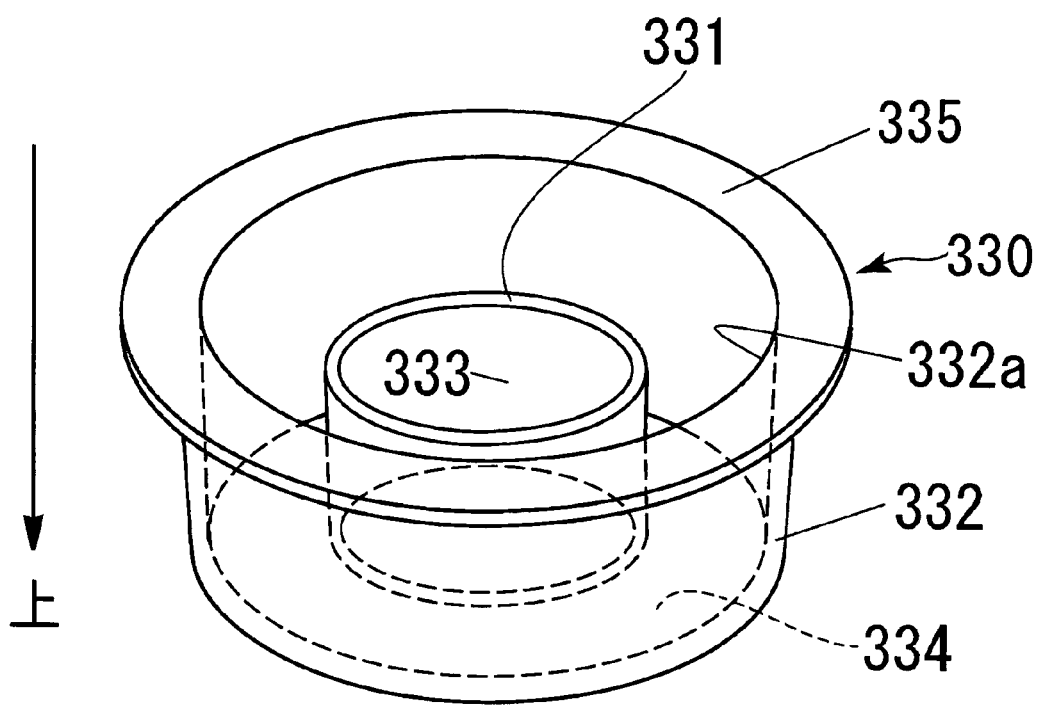
FIG. 21 is a perspective view illustrating a modified example of the yoke with a tab in accordance with the present invention.

A yoke 330 with an increased bonding surface according to another preferred embodiment of the present invention is shown in FIG. 21. The yoke 330 with an increased bonding surface is comprised of a flange portion 335 formed along the outer circumference of the end surface 332a of the outer cylindrical portion 332, the flange 335 being flush with the end surface 332a and extending outwardly from the outer cylindrical portion 332.

Referring to FIG. 21, just like the yoke 30 described above, the yoke 330 with an increased bonding surface comprises an inner cylindrical portion 331 having an insertion bore 333 into which the hollow body portion 11 of the holder 10 is adapted to be received, an outer cylindrical portion 332 provided outside of the inner cylindrical portion 331 with a predetermined spacing left therebetween, and a connecting portion 334 for integrally interconnecting the ends of the inner cylindrical portion 331 and the outer cylindrical portion 332 at opposite side from the flange portion 12 of the holder 10. Moreover, the yoke 330 is adapted to accommodate the coil 20 within the space of predetermined gap size between the inner cylindrical portion 331 and the outer cylindrical portion 332.

Integrally formed with the end surface 332a of the outer cylindrical portion 332 of the yoke 330 which is opposite to the connecting portion 334 is an increased bonding surface that serves to adhesively retain the outer annulus 62 of the leaf spring (60L). The increased bonding surface is comprised of a flange portion 335 integrally formed with the end surface 332a of the outer cylindrical portion 332, the flange portion 335 being flush with the end surface 332a and extending outwardly therefrom.

Referring again to FIG. 20, just like the yoke 30 described above, the yoke 330 is formed through the steps of bending and drawing a thin plate into a predetermined configuration including the flange portion 335 and then cutting the waste part 338 (indicated in broken lines) in a press forming process. The yoke 330 can be produced with ease due to the fact that the flange portion 335 is integrally formed with the outer cylindrical portion 332 of the yoke 330.

The end surface 332a of the outer cylindrical portion 332 and the cross-section of the flange portion 335 form a continuous surface. Therefore, according to this improved yoke 330 of the second embodiment, it is possible to provide a sufficient bonding area to be bonded to the lower leaf spring 60L without taking the smoothness and flatness of the surface of the end surface of the outer cylindrical portion 332 as discussed with reference to FIG. 18.

The surface of the flange portion 335 remaining in contact with the outer annulus 62 of the lower leaf spring 60L is in a generally parallel relationship with the top surface of the connecting portion 334 of the yoke 330, and it is formed along the outer periphery of the end surface 332a of the outer cylindrical portion 322. This assures that the yoke 330 can make contact with the lower leaf spring 60L at a broader area than the bottom end surface of the outer cylindrical portion 32 of the afore-mentioned yoke 30 does. Accordingly, the yoke 330 has the ability to adhesively retain the outer annulus 62 of the lower leaf spring 60L in a more stable and reliable manner. This increases the bonding strength between the yoke 330 and the lower leaf spring 60L, thereby preventing the possibility that the leaf springs may be detached or dislocated when a shock is applied to the autofocus actuator 1.

The yoke 330 is formed in such a manner that the outer cylindrical portion 332 thereof has a somewhat smaller diameter and further that the overall size thereof including of the flange portion 335 becomes equal to the size of the cylindrical yoke 30. Accordingly, the bonding area of the yoke 330 with the outer annulus 62 of the lower leaf spring 60L can be increased without having to change the overall size of the yoke 330.

In accordance with the autofocus actuator of this preferred embodiment of the present invention described above, the outer annulus 62 of the lower leaf spring 60L is bonded both to the end surface 332a of the outer cylindrical portion 332 and the flange portion 335. As a result, the leaf springs can be firmly bonded to the yoke 330 in a more stable and reliable manner, as compared to the case that the leaf spring is bonded only to the end surface of the outer cylindrical portion 32 of the yoke 30 as in the autofocus actuator 1 on which the present invention is based. Further, the yoke 330 can be produced with ease through an integral forming process.

Similarly, a bonding surface may be additionally provided even to the generally square yoke 300 and the generally hexagonal yoke 310 respectively described above and shown in FIGS. 15 and 16. More specifically, a tab-shaped portion or a flange portion may be integrally formed with the end surfaces of the outer cylindrical portions 302, 312 such that it remains flush with the end surface and extends outwardly from the generally square yoke 300 or the generally hexagonal yoke 310. This would increase the bonding area of the yokes 300 and 310 with the outer annulus 62 of the lower leaf spring 60L.

It should be understood that the present invention is not limited to the preferred embodiments described hereinabove and, needless to say, a variety of modifications or variations may be made without from the scope of the invention defined in the following claims.

What is claimed is:

1. An autofocus actuator, comprising:
   a holder having a hollow body portion having one end to which a lens is attached;
   a coil fixedly secured to the holder in such a manner as to surround the hollow body portion of the holder;
   a pair of leaf springs respectively provided on opposite end sides of the hollow body portion of the holder for supporting the holder displaceably in an optical axis direction of the lens with the holder being positioned in a radial direction; and
   a yoke having a permanent magnet provided in a confronting relationship with the coil, the yoke adapted to adjust the position of the lens attached to the holder in the optical axis through the use of interaction between a magnetic field of the permanent magnet and a magnetic field generated by the coil as the coil is supplied with electric power, wherein the yoke has an end surface that makes contact with the leaf spring positioned on the other end of the hollow body portion of the holder, and the end surface of the yoke is integrally formed with an increased bonding surface for retaining the leaf spring with an adhesive;
   wherein the increased bonding surface comprises at least one tab-shaped portion integrally formed with the end surface of the outer cylindrical portion of the yoke in such a manner that the tab-shaped portion remains flush with the end surface of the outer cylindrical portion and extends outwardly from the outer cylindrical portion.

2. The autofocus actuator as recited in claim 1, wherein the yoke comprises an inner cylindrical portion having an insertion bore into which the hollow body portion of the holder is adapted to be received and an outer cylindrical portion provided outside of the inner cylindrical portion with a predetermined spacing left between the inner cylindrical portion and the outer cylindrical portion by a connecting portion, the end surface of the yoke being an end surface of the outer cylindrical portion thereof.

3. The autofocus actuator as recited in claim 1, wherein the tab-shaped portion comprises four tab-shaped portions integrally provided on the end surface of the outer cylindrical portion of the yoke with an angular spacing of substantially 90 degrees.

4. The autofocus actuator as recited in claim 3, wherein each of the tab-shaped portions has a peripheral edge substantially in coincide with a tangential line of the end surface of the outer cylindrical portion of the yoke.

5. The autofocus actuator as recited in claim 3, wherein the tab-shaped portions are so formed as to leave a concave portion between the adjacent tab-shaped portions.

6. An autofocus actuator, comprising:
- a holder having a hollow body portion having one end to which a lens is attached;
- a coil fixedly secured to the holder in such a manner as to surround the hollow body portion of the holder;
- a pair of leaf springs respectively provided on opposite end sides of the hollow body portion of the holder for supporting the holder displaceably in an optical axis direction of the lens with the holder being positioned in a radial direction; and
- a yoke having a permanent magnet provided in a confronting relationship with the coil, the yoke adapted to adjust the position of the lens attached to the holder in the optical axis through the use of interaction between a magnetic field of the permanent magnet and a magnetic field generated by the coil as the coil is supplied with electric power, wherein the yoke has an end surface that makes contact with the leaf spring positioned on the other end of the hollow body portion of the holder, and the end surface of the yoke is integrally formed with an increased bonding surface for retaining the leaf spring with an adhesive;

wherein the yoke comprises an inner cylindrical portion having a insertion bore into which the hollow body portion of the holder is adapted to be received and an outer cylindrical portion provided outside of the inner cylindrical portion with a predetermined spacing left between the inner cylindrical portion and the outer cylindrical portion by a connecting portion, the end surface of the yoke being an end surface of the outer cylindrical portion thereof; and wherein the increased bonding surface comprises a flange portion integrally formed along a periphery of the end surface of the outer cylindrical portion of the yoke in such a manner that the flange portion remains flush with the end surface of the outer cylindrical portion and extends onwardly from the outer cylindrical portion.

* * * * *